(12) United States Patent
Yasuda

(10) Patent No.: US 8,135,120 B2
(45) Date of Patent: Mar. 13, 2012

(54) METHOD AND APPARATUS FOR CONTROLLING RESTRICTION ON CALL CONNECTIONS

(75) Inventor: Takashi Yasuda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 360 days.

(21) Appl. No.: 12/568,247

(22) Filed: Sep. 28, 2009

(65) Prior Publication Data
US 2010/0014652 A1 Jan. 21, 2010

Related U.S. Application Data

(63) Continuation of application No. PCT/JP2007/057189, filed on Mar. 30, 2007.

(51) Int. Cl.
*H04M 3/00* (2006.01)
*H04M 1/66* (2006.01)
*H04B 7/00* (2006.01)
*H04W 72/00* (2009.01)

(52) U.S. Cl. ........ 379/196; 379/188; 379/200; 455/453; 455/518; 455/519

(58) Field of Classification Search .................. 379/196, 379/200, 188; 455/404.1, 521, 453, 423, 455/518, 519, 452.1, 452.2, 512; 370/328, 370/329, 338, 465, 468
See application file for complete search history.

(56) References Cited

U.S. PATENT DOCUMENTS
7,764,680 B2 * 7/2010 Matsumoto et al. .......... 370/389

FOREIGN PATENT DOCUMENTS
JP 07303280 11/1995
JP 2002016976 1/2002
JP 2003283656 10/2003

OTHER PUBLICATIONS
International Search Report dated Jul. 31, 2007.

* cited by examiner

*Primary Examiner* — Thjuan K Addy
(74) *Attorney, Agent, or Firm* — Murphy & King, P.C.

(57) ABSTRACT

Restriction on call connections is controlled by grouping a plurality of terminals. One or more groups each including one or more terminals are provided. Each of the one or more groups is associated with the maximum number of calling terminals and a group restriction relaxing ratio indicating a relaxing degree of restriction with respect to a predetermined normal restriction ratio. Restriction on a call connection of a terminal belonging to a group is controlled on the basis of a group restriction ratio assigned to the group when the number of terminals being making phone calls is less than the maximum number of calling terminals that is provided for the group. The group restriction ratio is calculated using the predetermined normal restriction ratio and the group restriction relaxing ratio associated with the group.

16 Claims, 25 Drawing Sheets

FIG. 6

| GROUP ID 211 | GROUP LOCATION INFORMATION 212 | NUMBER OF BELONGING TERMINALS 213 | NUMBER OF CALLING TERMINALS 214 | UPDATE INDICATING FLAG 215 | DIFFERENCE NUMBER OF BELONGING TERMINALS 216 | DIFFERENCE NUMBER OF CALLING TERMINALS 217 |
|---|---|---|---|---|---|---|
| 6wgxkja82 | 56734 | 30 | 1 | ON | +3 | +1 |
| 7ayyjdhiwqd | 26378 | 5 | 0 | OFF | 0 | 0 |
| hjkuew8628 | 11234 | 10 | 1 | ON | +1 | 0 |
| 76yd8qh3jfs | 11235 | 10 | 0 | OFF | 0 | 0 |
| dh782y3dhw | 11238 | 0 | 0 | ON | −1 | 0 |
| ... | ... | ... | ... | ... | ... | ... |

FIG. 10

| | MINIMUM NUMBER OF TERMINALS (321) | MAXIMUM NUMBER OF TERMINALS (322) | GROUP RESTRICTION RELAXING RATIO (323) | MAXIMUM NUMBER OF CALLING TERMINALS (324) | MAXIMUM CALL DURATION TIME (325) |
|---|---|---|---|---|---|
| (A) | 4 | 6 | 30% | 1 | 180 SEC |
| (B) | 7 | 10 | 50% | 1 | 180 SEC |
| (C) | 11 | 20 | 70% | 1 | 180 SEC |
| (D) | 21 | 30 | 100% | 1 | 180 SEC |
| (E) | 31 | 50 | 100% | 2 | 180 SEC |
| (F) | 51 | 100 | 100% | 3 | 180 SEC |
| (G) | 101 | 200 | 100% | 4 | 180 SEC |
| (H) | 201 | 300 | 100% | 5 | 180 SEC |
| ... | ... | ... | ... | ... | ... |

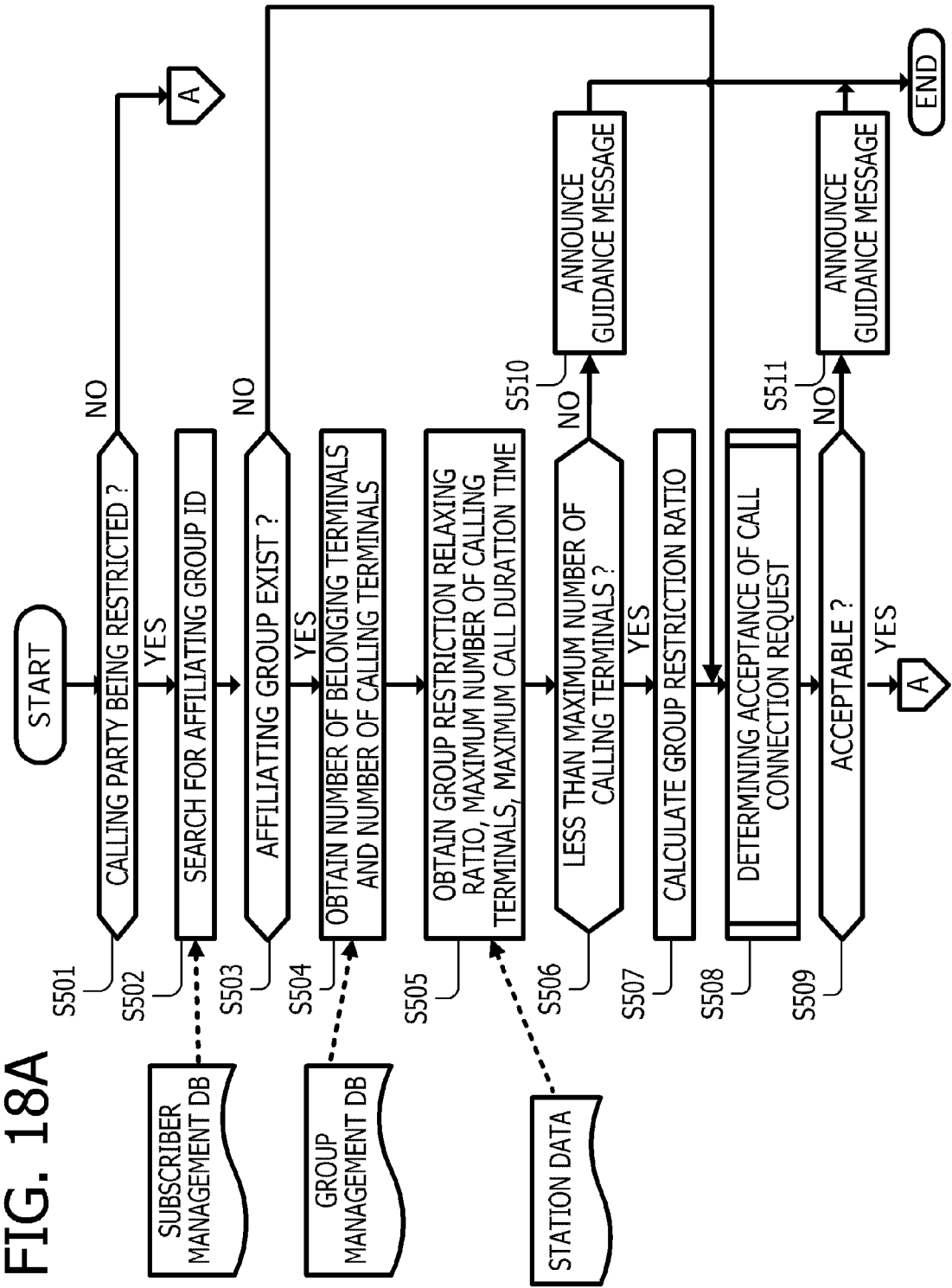

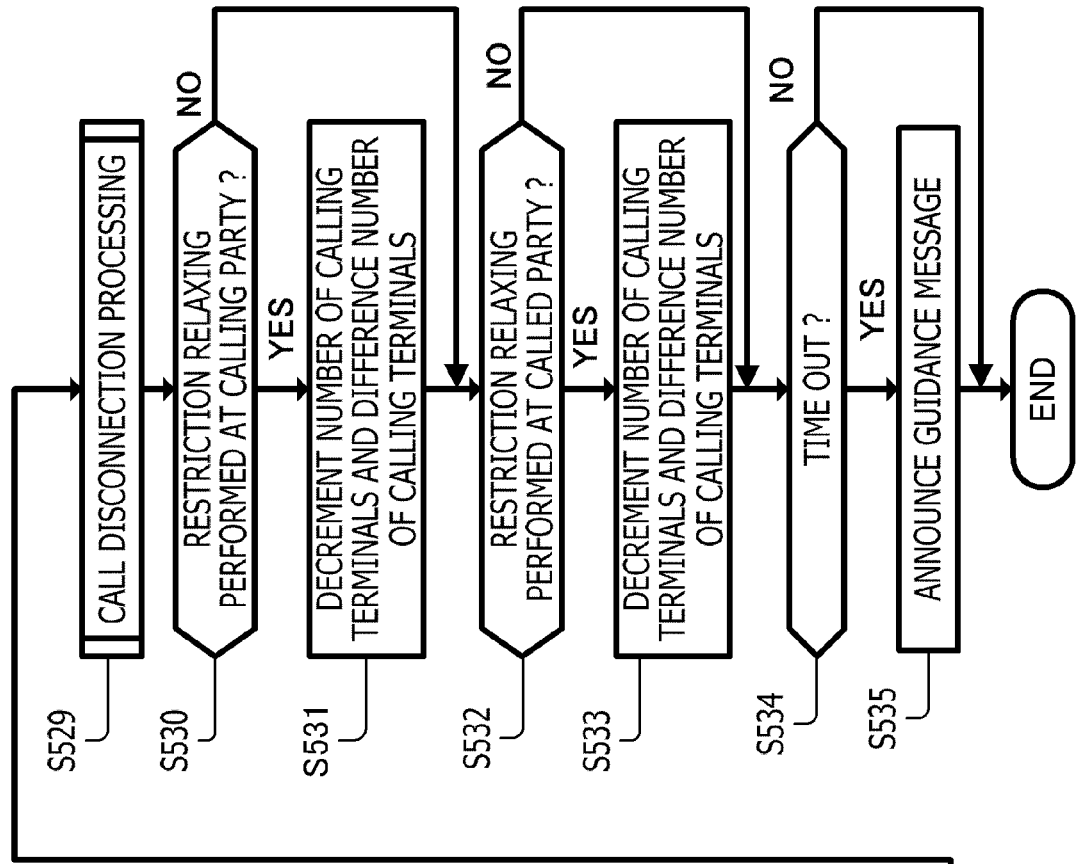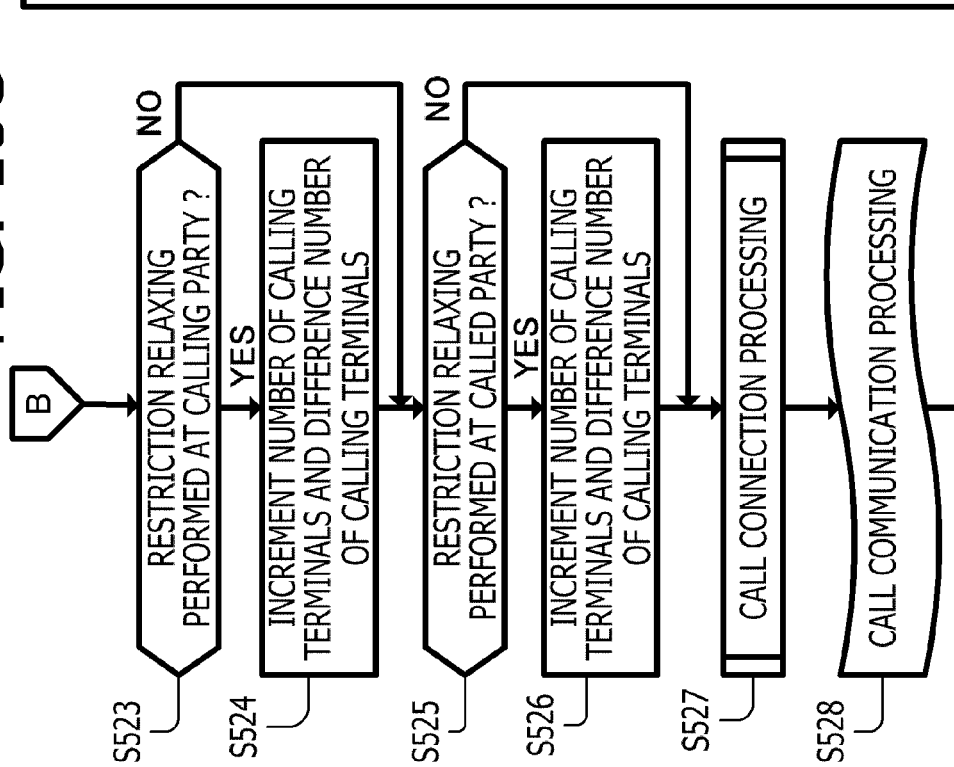
FIG. 18C

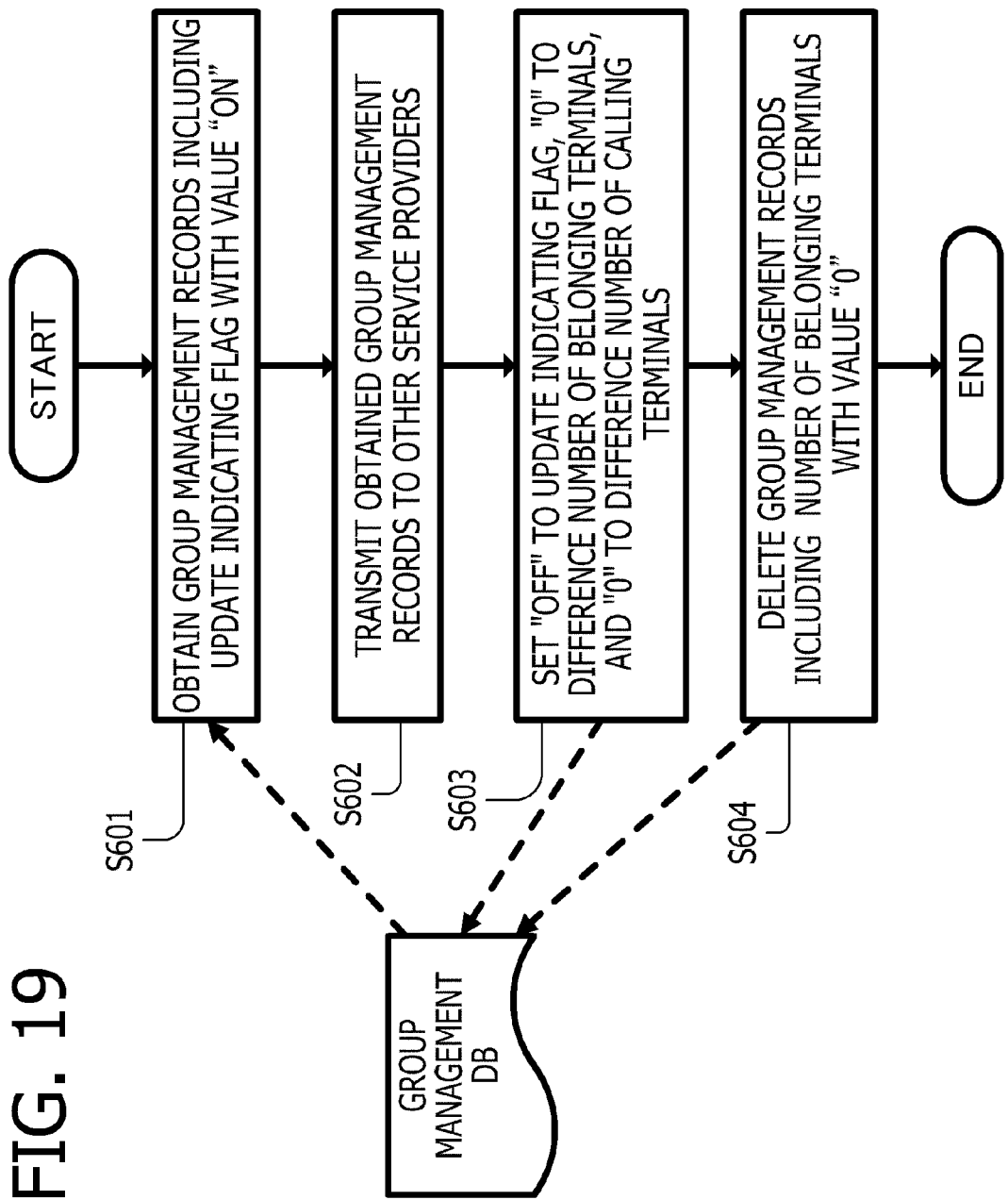

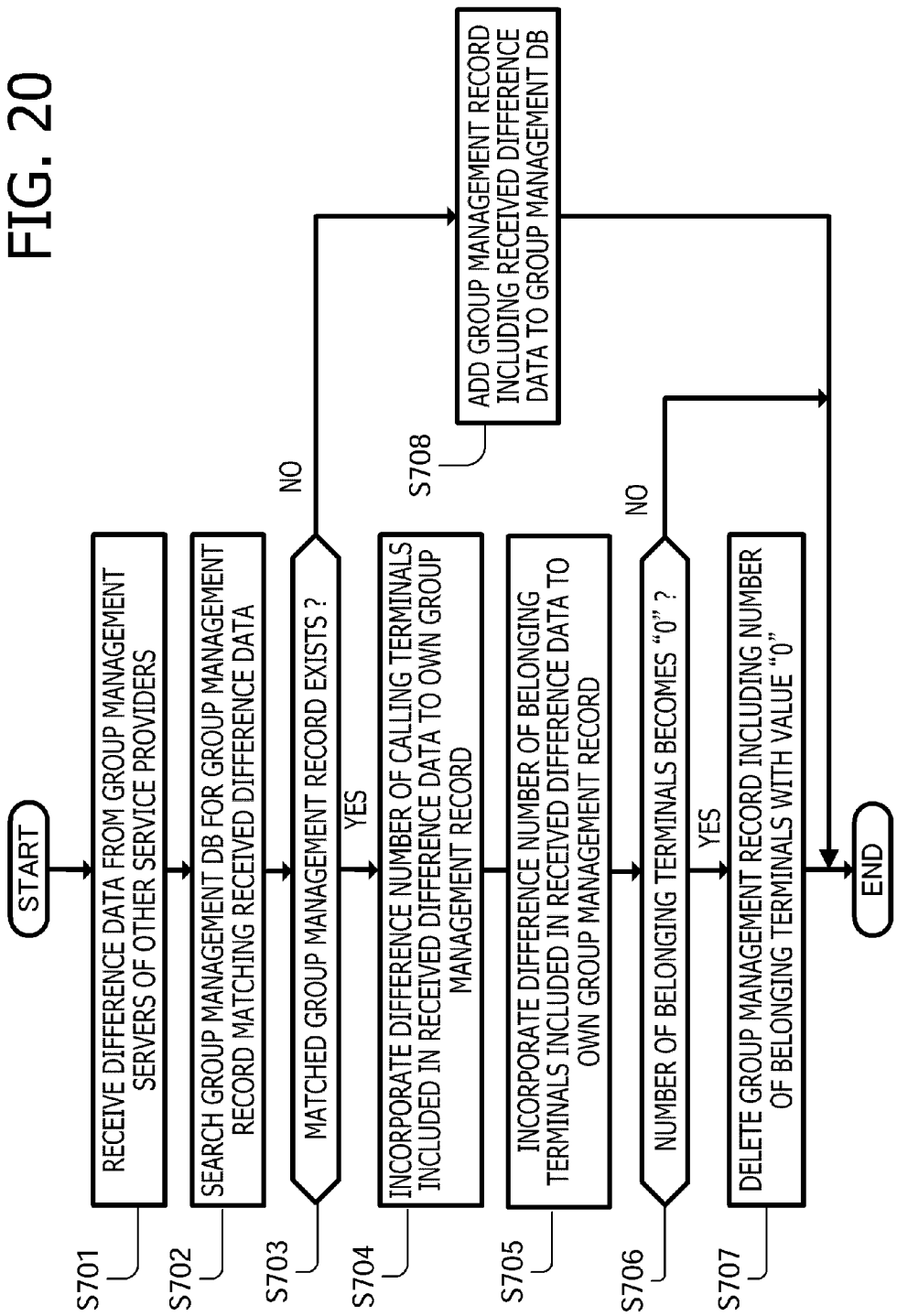

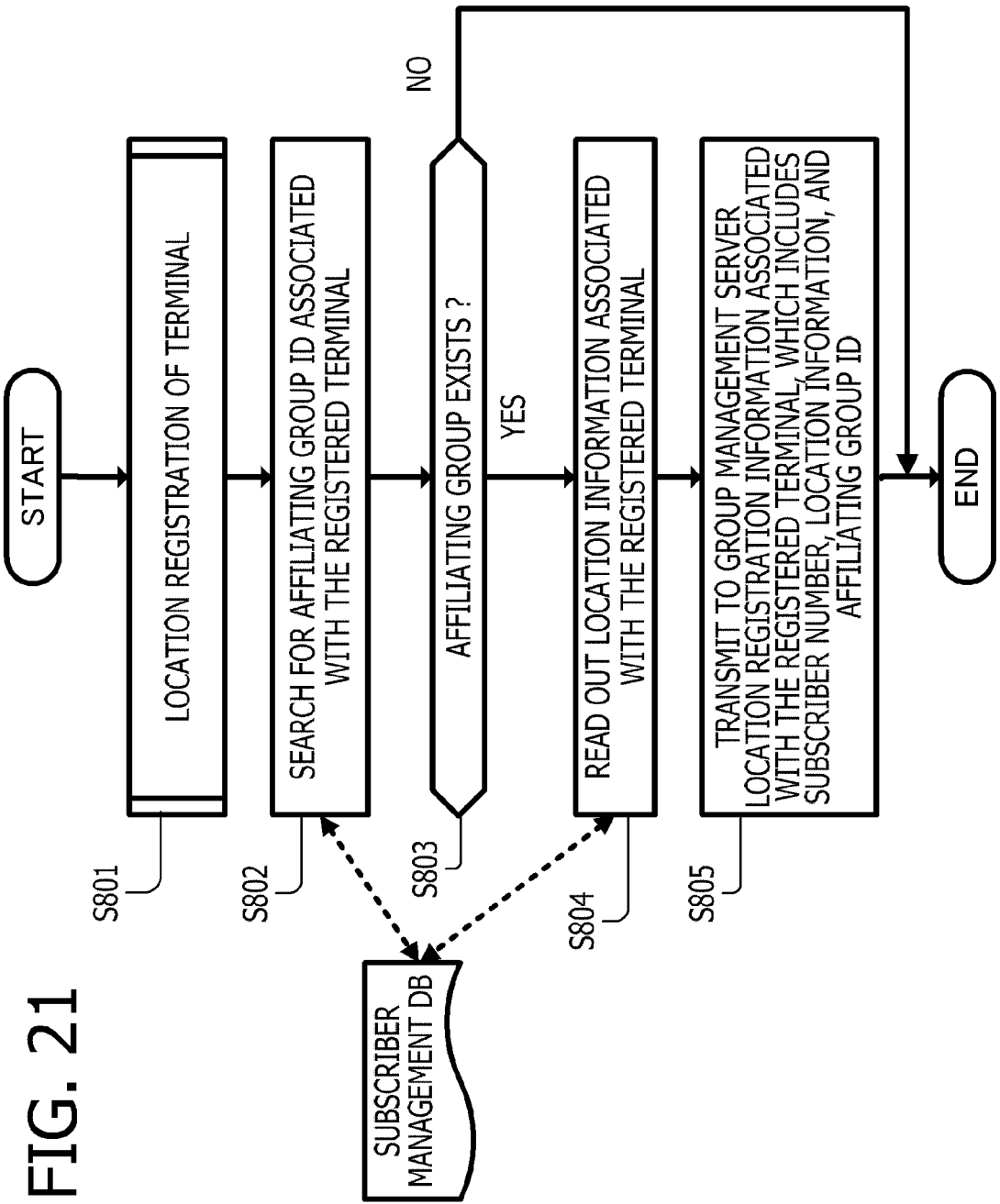

METHOD AND APPARATUS FOR CONTROLLING RESTRICTION ON CALL CONNECTIONS

CROSS-REFERENCE TO RELATED APPLICATION

This is a continuation of Application PCT/JP2007/057189, filed on Mar. 30, 2007, the entire contents of which are incorporated herein by reference.

FIELD

The present invention relates to technologies for controlling restriction on call connections.

BACKGROUND

Upon occurrence of a disaster, such as an earthquake, for example, for reasons of confirmation of the safety of acquaintances, a large number of call-connection requests are made to communication networks, such as a mobile telephone network, from mobile phones and fixed phones. However, since the number of calls which can be processed by apparatuses, such as exchanges and servers, installed on the communication networks are limited, it is difficult to process all of the call connection requests. Further, in the worst case, the whole of the communication networks may not function well. In order to prevent occurrence of such a condition, in the case where excessive overloading on the networks arises, restriction control is performed on a fixed proportion of call connection requests from user terminals, for example, by an announcement of a guidance message such as "Calls are unlikely to be connected. Call again after a while."

FIG. 1 is a schematic diagram illustrating an example of a method for controlling restriction on call connections, in which call congestion has arisen. FIG. 1 indicates a case where, for example, a mobile telephone network 900 is requested to connect calls under the condition where, due to occurrence of a disaster or the like, congestion of call connection requests from mobile phones has arisen. Existing restriction control of mobile phones is performed basically in accordance with subscriber classes set for individual mobile telephone users. A few VIP user terminals belong to a class which allows them to be call-connected with high priority, and therefore, are relatively likely to be call-connected even under the condition where congestion occurs; however, most of normal user terminals, which belong to a class of the lowest priority, are unlikely to be able to make phone calls under the condition where restriction control due to arising of congestion is performed. Further, since most of normal user terminals belong to the same class, as a result, a uniform restriction 910 is executed for normal user terminals 1-1, 1-2, . . . , 1-$n$. For example, a 90%-restriction is uniformly imposed on normal user terminals 901-1, 90-2, . . . , 90-$n$. That is, all terminals become subject to a condition where they can make phone calls on average only at a rate of one out of ten call connection requests therefrom.

However, in the following cases, it is difficult to say that good services are provided when performing such a uniform restriction control on all user terminals.

(A1) When a disaster occurs, people are likely to be living in groups, such as a family. In this case, provided that making a phone call with any one of family members is enabled, it is possible to confirm the security of all of the family members. However, in an existing method, since the same restriction control is performed on all the family members, a degree of difficulty in call-connecting a mobile phone is the same for each of the family members, regardless of the number of the family members.

(A2) Upon occurrence of a disaster, in some cases, public telephones, which are likely to be call-connected more frequently than regular telephones, may be temporarily installed at evacuation places; however, this method needs a lot of cost and time. In contrast, in the case of a mobile phone, a lot of people own mobile phones, and utilization of them suppresses increase of cost and time. However, under the present situation, since the same restriction control is performed on all the user terminals, all the terminals fall into a state in which they are unlikely to be call-connected, and as a result, the mobile phones remain unable to be effectively utilized.

In order to overcome the foregoing disadvantages (A1) and (A2), Japanese Laid-open Patent Publication No. 2002-16976 discloses a method, which allows user groups to be created at a server side, and allows each of the groups to be supplied with a certain clock time during which call connections from the group are preferentially allowed. However, in this method, there are some limitations described below.

(B1) Clock times at which call connections are allowed are restricted.

(B2) Setting of the groups is performed at the initiative of a network side, and therefore, users cannot intervene in the setting. Accordingly, for example, the disadvantage (A1) cannot be solved. That is, it is not possible to perform such a control that any one of family members is allowed to make a phone call to confirm the safety of all the family members.

Although a mobile telephone network is depicted as a representative example in FIG. 1, the same is in the case of a fixed telephone network, the similar situation can occurs. Upon occurrence of a disaster, for example, call connections associated with individual fixed phones of houses located in the same region are uniformly restricted, and this restriction may cause occurrence of the similar situation in which the fixed phones of all houses located in the region are unable to make phone calls.

SUMMARY

According to an aspect of the embodiment, there is provided a method in a system including a plurality of terminals, a call control apparatus for controlling restrictions on a call connection of the plurality of terminals, and a group management apparatus for grouping the plurality of terminals. According to the method, the group management apparatus creates one or more groups each including one or more terminals included in the plurality of terminals; the call control apparatus associates each of the one or more groups with the maximum number of calling terminals and a group restriction relaxing ratio indicating a relaxing degree of restriction with respect to a predetermined normal restriction ratio; the call control apparatus controls restrictions on a call-connection of a first terminal belonging to none of the one or more groups, on the basis of the predetermined normal restriction ratio; and the call control apparatus controls restrictions on a call-connection of a grouped terminal belonging a first group included in the one or more groups, on the basis of a group restriction ratio assigned to the first group when the number of calling terminals within the first group is less than the maximum number of calling terminals that is associated with the first group, wherein the group restriction ratio is calculated using the predetermined normal restriction ratio and a group restriction relaxing ratio associated with the first group.

The object and advantages of the embodiment will be realized and attained by means of the elements and combinations particularly pointed out in the claims.

It is to be understood that both the forgoing general description and the following detailed description are exemplary and explanatory and are not respective of the embodiment, as claimed.

BRIEF DESCRIPTION OF THE DRAWINGS

FIG. 6 is a diagram illustrating an example of a group management record block, according to an embodiment;

FIG. 10 is a diagram illustrating an example of values set as group restriction relaxing information, according to an embodiment;

FIGS. 18A, 18B, and 18C are diagrams illustrating an example of an operational flowchart of a call control apparatus, according to an embodiment;

FIG. 19 is a diagram illustrating an example of an operational flowchart of a group management apparatus, according to an embodiment;

FIG. 20 is a diagram illustrating an example of an operational flowchart of a group management apparatus, according to an embodiment;

FIG. 21 is a diagram illustrating an example of an operational flowchart of a call control server when performing a location registration in conjunction with a movement of a user terminal, according to an embodiment.

DESCRIPTION OF EMBODIMENTS

Figure 1:
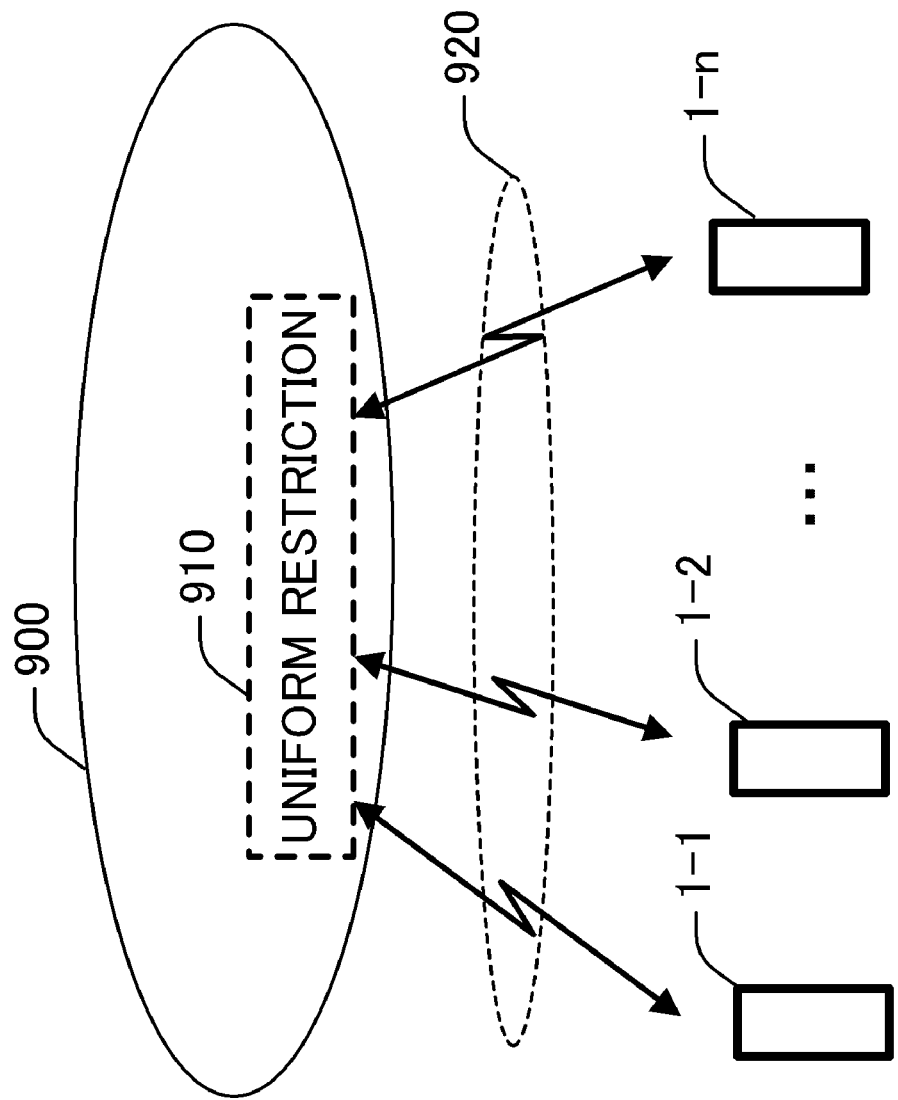
FIG. 1 is a schematic diagram illustrating an example of a method for controlling restriction on call connections.
Figure 2:
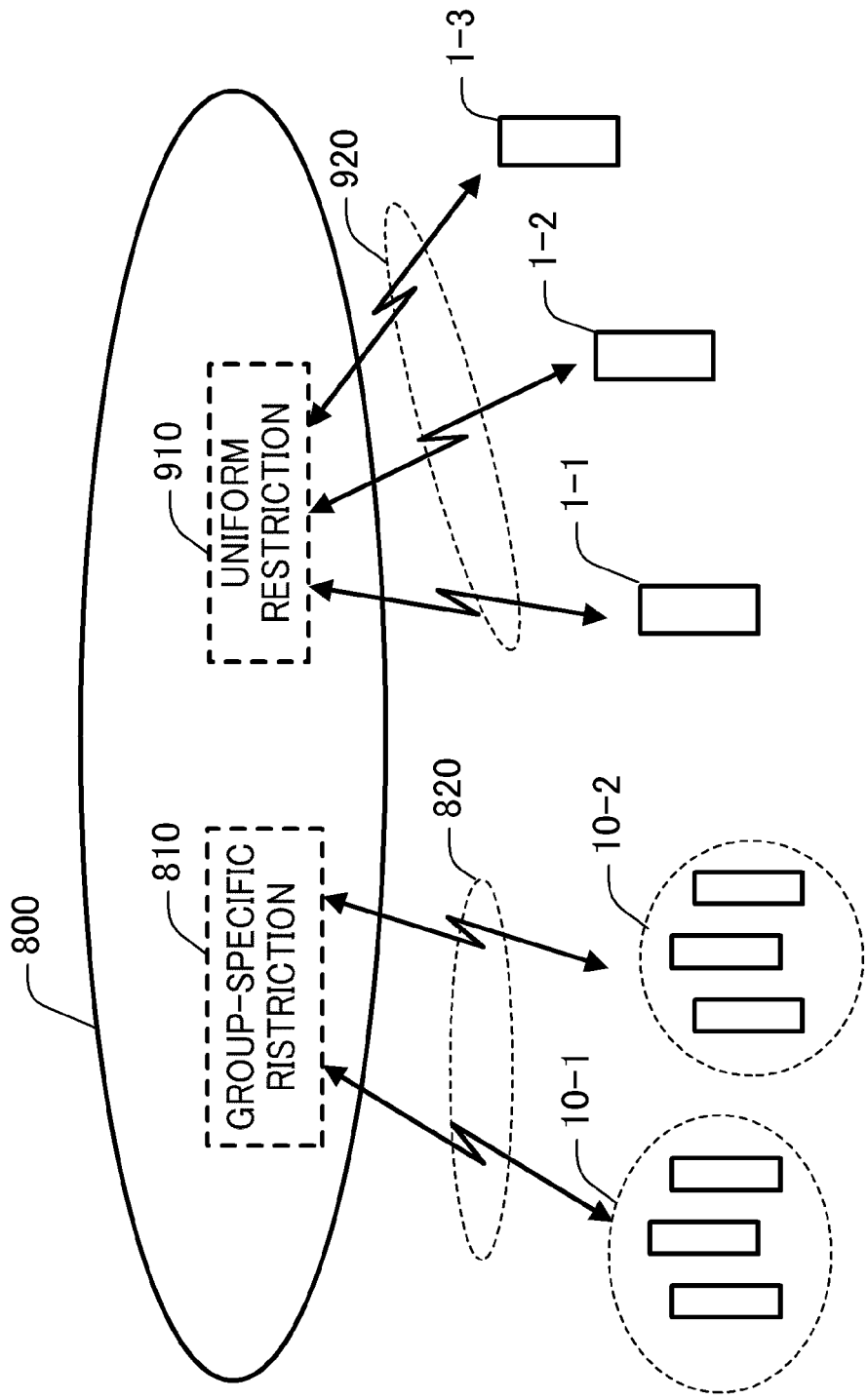
FIG. 2 is a schematic diagram illustrating an example of a method for controlling restriction on call connections, according to an embodiment.

FIG. 2 is a schematic diagram illustrating an example of a method for controlling restriction on call connections, according to an embodiment.

In this embodiment, one or more groups each including a plurality of terminals are defined, and upon receipt of an originating call from a terminal, a group to which the terminal belongs is identified, and then control of restrictions on a call connection of the terminal is performed on the basis of information on present or past connection control with respect to terminals belonging to the group (there are two cases: a case where the terminal itself is included therein, and a case where the terminal itself is not included therein).

More specifically, firstly, a group including a plurality of terminals is set (created) in advance. A plurality of groups can be created. FIG. 2 indicates an example in which two terminal groups 10-1 and 10-2 are created. This group creation can be performed in such a way that a user registers in the network side identification information identifying a user's terminal constituting the group by operating the user's terminal, or a user asks a service provider in advance to make a registration of identification information identifying a user's terminal constituting the group by using another terminal or telephone.

A group may be made up of terminals corresponding to group members usually existing in the same region, such as family members, employees in a company, or neighboring residents gathering in an evacuation center. Also, a group can be set in advance. Although FIG. 2 is a schematic diagram in the case of a mobile telephone network, fixed phones can be used as a terminal. In such a case, a group can be made up of neighboring houses located in the same region.

In addition, restriction control of call connections within a group can be performed on each of a plurality of groups. The content of the restriction control within a group may be fixed; however, the content of the restriction control of call connections within each group can be configured to be selected and set by operations performed on a user terminal of each group, or by registering the content in advance.

Contents of restriction control within a group includes, for example, restriction on the number of terminals allowed to make communication simultaneously (around the same time) within the group. This restriction control can be one of methods for controlling restrictions on the basis of present connection control regarding terminals belonging to the group (there can be two cases: a case where the terminal itself included therein, or a case where the terminal itself is not included therein). For example, as the number of terminals allowed to simultaneously make communication, N (N is a natural number less than the number of terminals belonging to the group) can be registered in the network side in advance as a parameter for restriction control.

Further, for example, it is also possible that the number of terminals M (natural number) is set in advance as a parameter, and within the range of M, restriction of call connections is relaxed, that is, controlled so that calls are likely to be connected, compared with restriction on call connections beyond the range of M.

In addition, it is also possible to set, as the maximum number of terminals allowed to be simultaneously call-connected, a larger value in proportion to increase of terminals belonging to a group, or to set, as the maximum number of terminals allowed to be simultaneously call-connected, a fixed value regardless of increase of terminals belonging to the group.

Furthermore, the degree of relaxing restriction is controlled, for example, in accordance with the number of users belonging to a group, and may be controlled so that the proportion of calls allowed to be connected to the group is increased in proportion to increase of the number of the users belonging to the group.

As one of the contents of restriction control, it is also possible to use restriction control based on past connection control regarding terminals belonging to a group (there are two cases: a case where the terminal itself is included therein, or a case where the terminal itself is not included therein).

For example, it is possible to perform restriction control so that, up to P (a natural number) call connection requests from terminals can be accepted within a predetermined time period, and call connection requests from terminals, the number of which exceeds P, cannot be accepted before elapse of the predetermined time period.

It is also possible to set a total amount of communication time within a predetermined time period and to accumulate the total amount of communication time during the predetermined time period that has passed with respect to terminals belonging to a group. In the case where the total amount of communication time does not exceed the set time, new call connection requests from terminals within the group are accepted, and in contrast, in the case where the total amount of communication time exceeds the set time, new call connection requests from terminals within the group are rejected. These can be given as an example of the restriction control performed on the basis of past connection control regarding terminals belonging to a group.

As described above, the probability of causing call connection requests to be rejected due to restriction is likely to be prevented by performing restriction control on the basis of information on present or past connection control regarding terminals belonging to a group, to make adjustments among terminals within the group.

For example, a user can confirm the number of terminals which are currently performing communication among other terminals belonging to the same group by looking around. Then it is determined whether the confirmed number reaches the preset number of terminals allowed to make communication simultaneously (around the same time). In the case where the confirmed number does not reach the preset number, a call connection request is attempted, and, in the case where the confirmed number reaches the preset number, the call connection request can be made after waiting for completion of communication made by another terminal. Therefore, it is possible to reduce meaningless transmission of call connection requests, thereby contributing to reduction of congestion.

Further, it is also possible to prevent rejection of call connection requests due to restriction, for example, by making arrangements with users having terminals belonging to a group, so as to make communication at predetermined time intervals, and by sequentially making communication so that accumulated duration time thereof falls within the total amount of communication time set beforehand.

As mentioned above, it is possible to increase a success rate of originating calls and achieve reduction of congestion, by making adjustment within a group.

Figure 3:
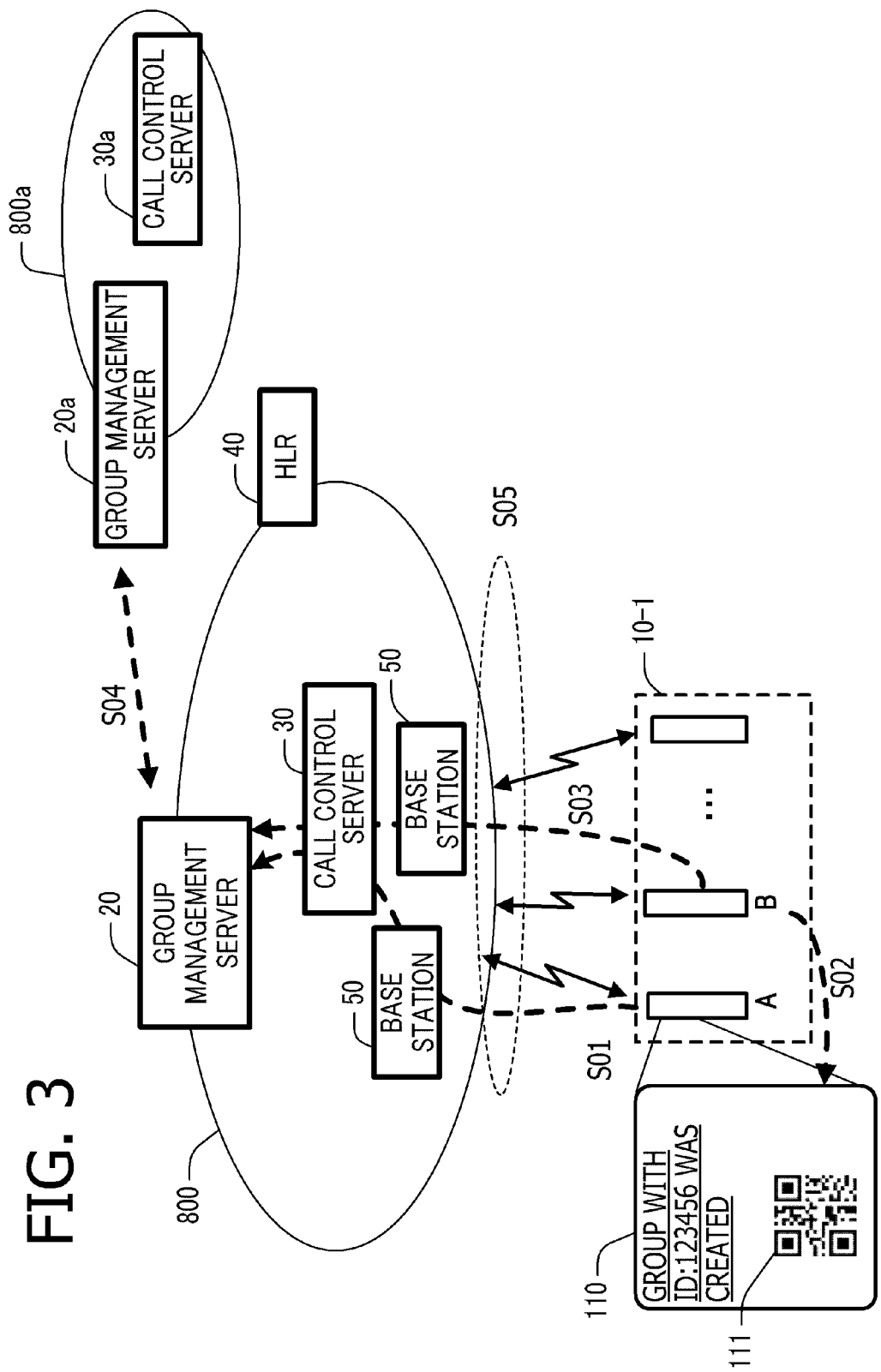
FIG. 3 is a diagram illustrating an example of a system for controlling restriction on call connections, according to an embodiment.

FIG. 3 is a diagram illustrating an example of a system for controlling restriction on call connections, according to an embodiment, in which mobile phones are used as terminals and an outline of call connection restriction control processing is depicted in association with steps S01 to S05.

A communication network 800 includes, for example, a group management server 20 as an example of a group management apparatus, a call control server as an example of a call connection apparatus, and base stations 50.

The communication network 800 is capable of cooperating with a communication network 800a owned by a different service provider, and the communication network 800a also includes a group management server 20a and a call control server 30a. In FIG. 3, only one different service provider is depicted; however, it is possible for the communication network 800 to cooperate with a plurality of different service providers.

In FIG. 3, one group 10-1, to which subscribers of the mobile telephone network belong as users, is depicted; however, the number of groups is not limited to one, but can be plural.

A system for controlling restriction on call connections according to the embodiment (hereinafter, also expressed as "a call connection restriction control system"), for example, can be configured to include a home location register HLR 40 as an apparatus configured to retain subscriber management information. The HLR 40 includes a subscriber information DB configured to store information for each subscriber, and is accessible not only from the group management server 20 and the call control server 30 located within the communication network 800, but also from the group management server 20a and the call control server 30a located within the communication network 800a owned by a different provider.

The call connection restriction control system can be configured, for example, to operate as described below in accordance with steps S01 to S05 depicted in FIG. 3.

In step S01, a representative (for example, a user A) of the group 10-1 consisting of users (or user terminals), accesses the group management server 20 by using a mobile telephone terminal A, so as to creates a new group. Then an ID of the created group is obtained, and displayed on a screen 110 of the terminal of the user A, for example, as a QR code 111. At this time, taking into account a case where a terminal not incorporating a camera therein is used, the group ID is concurrently displayed also in characters. A piece of information represented by the QR code 111 includes the group ID and a URL of the Web site of the group management server. Further, the group management server 20 retains a group management DB, and stores therein group IDs of all groups and information necessary for group management, such as the number of terminals belonging to each group.

In step S02, users belonging to the group 10-1, other than the representative thereof, read in the QR code 111 displayed on the terminal A of the representative by using their own mobile telephone terminal B. In the case where a terminal is not capable of identifying the QR code, the user having the terminal can manually input the group ID by manipulating keys on the terminal.

In step S03, users other than the representative access the group management server 20 by using the terminals B, and make a registration as a user belonging to the same group as the representative. An ID of a group to which each user belongs is set also to a subscriber management DB included in the HLR 40.

In step S04, in cooperation with the group management server 10a located within a communication network 800a owned by a different service provider, the group management server 20 transmits and receives the management information associated with the group 10-1 thereto/therefrom, and in this way, performs group restriction control across a plurality of service providers.

In step S05, under the condition where call congestion arises due to occurrence of a disaster or the like, each user, who has been registered at the group 10-1 in accordance with the foregoing steps S01 to S03, performs an operation of requesting a call connection in a manner similar to that under a normal condition.

Upon reception of the call connection request, the call control server 30, which is installed within the communication network 800, reads out subscriber information associated with the call originating user, and determines which group the call originating user belongs to. In the case where the call originating user does not belong to any groups, normal restriction control (uniform restriction control) is performed.

In the case where the call originating user belongs to a group, restriction relaxing in accordance with the scale of the group is performed. For example, under the condition where a normal 90%-restriction is invoked, (1) in the case where a call connection request is initiated from a user who does not belong to any groups, the 90%-restriction (one out of ten call connection requests is allowed to make a phone call) is performed in the same way as that under the normal restriction condition;

(2) in the case where a call connection request is initiated by a user who belongs to a group consisting of five members, a 50%-restriction (one out of two call connection requests is allowed to make a phone call) is performed;

(3) in the case where a call connection request is initiated from a user who belongs to a group consisting of ten members, a 20%-restriction (four out of five call connection requests are allowed to make phone calls) is performed; and (4) in the case where a call connection request is initiated from a user who belongs to a group consisting of thirty members, a 0%-restriction (no restriction is imposed) is performed. However, in this case, it is assumed that terminals which are allowed to simultaneously make phone calls are limited to only one terminal.

In the foregoing example (4) in which a group consists of thirty members, in the case where none of the other members within the group is making a phone call, the call connection request is certainly accepted, and in the case where any one of the other members within the group is making a phone call, a new call connection request is not accepted until completion of the phone call made by terminal of the members (for example, a guidance, such as "Someone is making a phone call in the same group. Wait for a while, and call again.", is announced). In the case of occurrence of a disaster or the like, users within a group usually exist close to each other. As a result, after confirmation of call completion of the targeted user by sight, operations of initiating a call connection can be made again.

In the case where restriction is also invoked to the called party side, a restriction relaxing process is performed in accordance with the scale of a group to which the called party belongs in a way similar to that described above.

As described above, by performing restriction relaxing of call connections for each group under the condition where call congestion occurs, the probability of allowing users to make phone calls can be increased even under the condition where call congestion occurs. Further, by preventing call connection requests repeatedly made from users, a service provider may be able to reduce congestion over the communication networks and increase performance of the whole communication networks. The above mentioned restriction control may provide a method alternative to public telephones, which are temporarily installed at evacuation centers under the condition where a disaster has occurred, and may contribute to disaster countermeasures.

Figure 4:
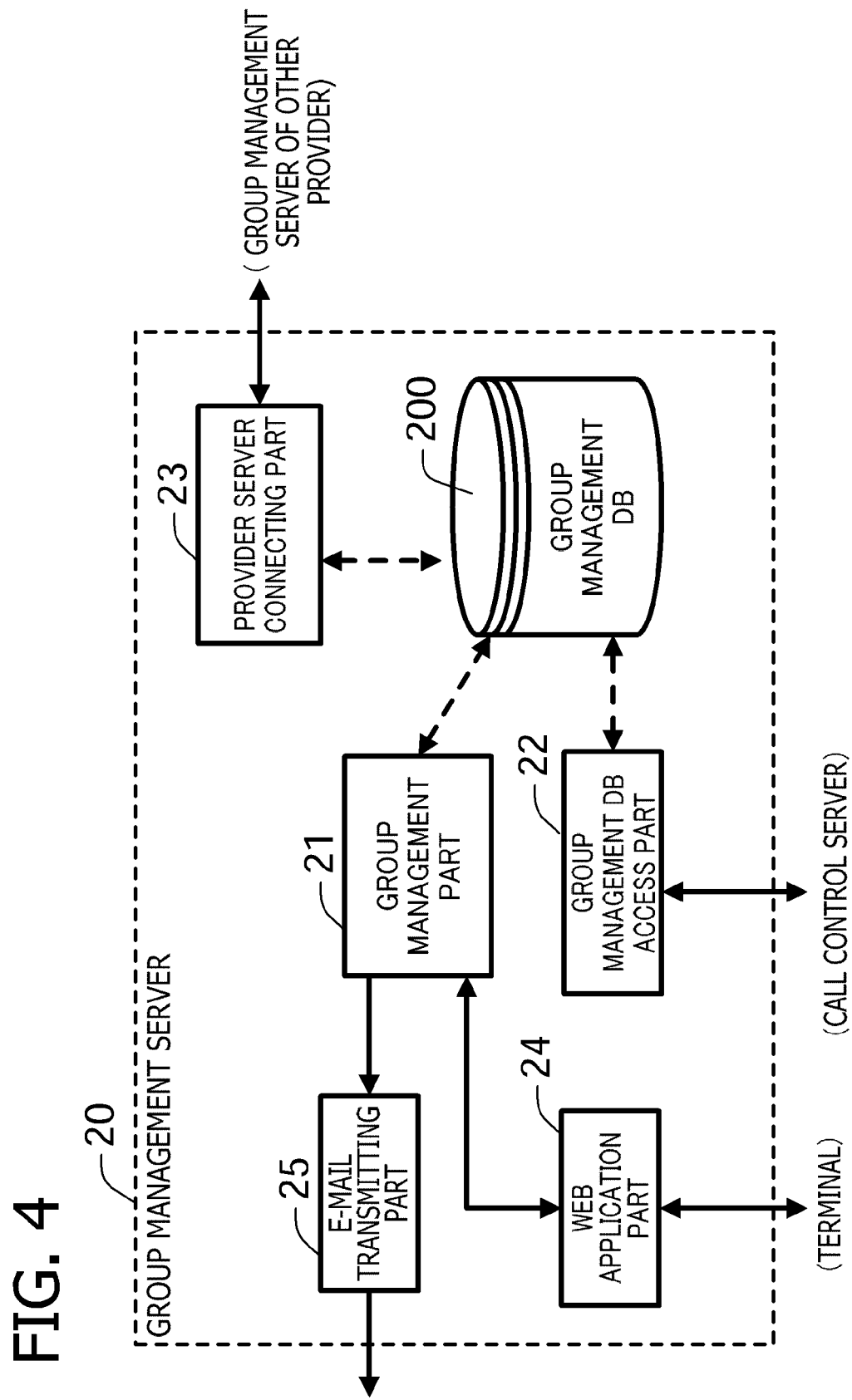
FIG. 4 is a diagram illustrating an example of a configuration of a group management apparatus, according to an embodiment.

FIG. 4 is a diagram illustrating an example of a configuration of a group management apparatus, according to an embodiment.

The group management server 20 used as an example of the management apparatus can be configured to include, for example, a group management part 21, a group management DB access part 22, a provider server connecting part 23, a Web application part 24, an e-mail transmitting part 25, and a group management DB 200.

The group management DB 200 is a block of records each storing pieces of configuration information associated with a group, and each of the records includes a group ID, group location information, and the number of belonging terminals, the number of calling terminals. The details thereof will be described below with reference to FIG. 5.

The group management part 21 performs group management such as registration and deletion of groups and provision of group IDs in conjunction with the Web application part 24. Data needed for the group management is retained in the group management DB 200. Further, the group management part 21 performs addition and deletion of user terminals belonging to each group, and updates the number of terminals belonging to the relevant group, which are retained in the group management DB 200, as well as the group IDs in the subscriber management DB included in the HLR 40.

The Web application part 24 performs control of a user interface that is used for registration and deletion of groups and for registration and deletion of user terminals, by using Web applications.

The group management DB access part 22 performs notification and updating of information retained in the group management DB 200 in response to requests from the call control server 30. For example, the maximum number of terminals 201 and configuration information associated with groups, which are retained in individual group management records, are transmitted to the call control server 30. Further, in response to requests from the call control server 30, the group management DB access part 22 updates the number of calling terminals and the difference number of calling terminals, which are included in individual group management records.

The provider server connecting part 23 periodically communicates with group management servers 20a of different service providers, and causes the contents of the group management DBs of different service providers to conform to each other.

The e-mail transmitting part 25 notifies terminals of registration conditions of individual groups by using e-mails when needed. For example, in the case where a terminal owned by a user exists apart from a location of a group to which the terminal initially belonged, in conjunction with a movement of the user, the group management server 20 deletes the user terminal from the group, and then, transmits an e-mail notifying that the terminal has been deleted from the group to the user terminal via the e-mail transmitting part 25.

Figure 5:
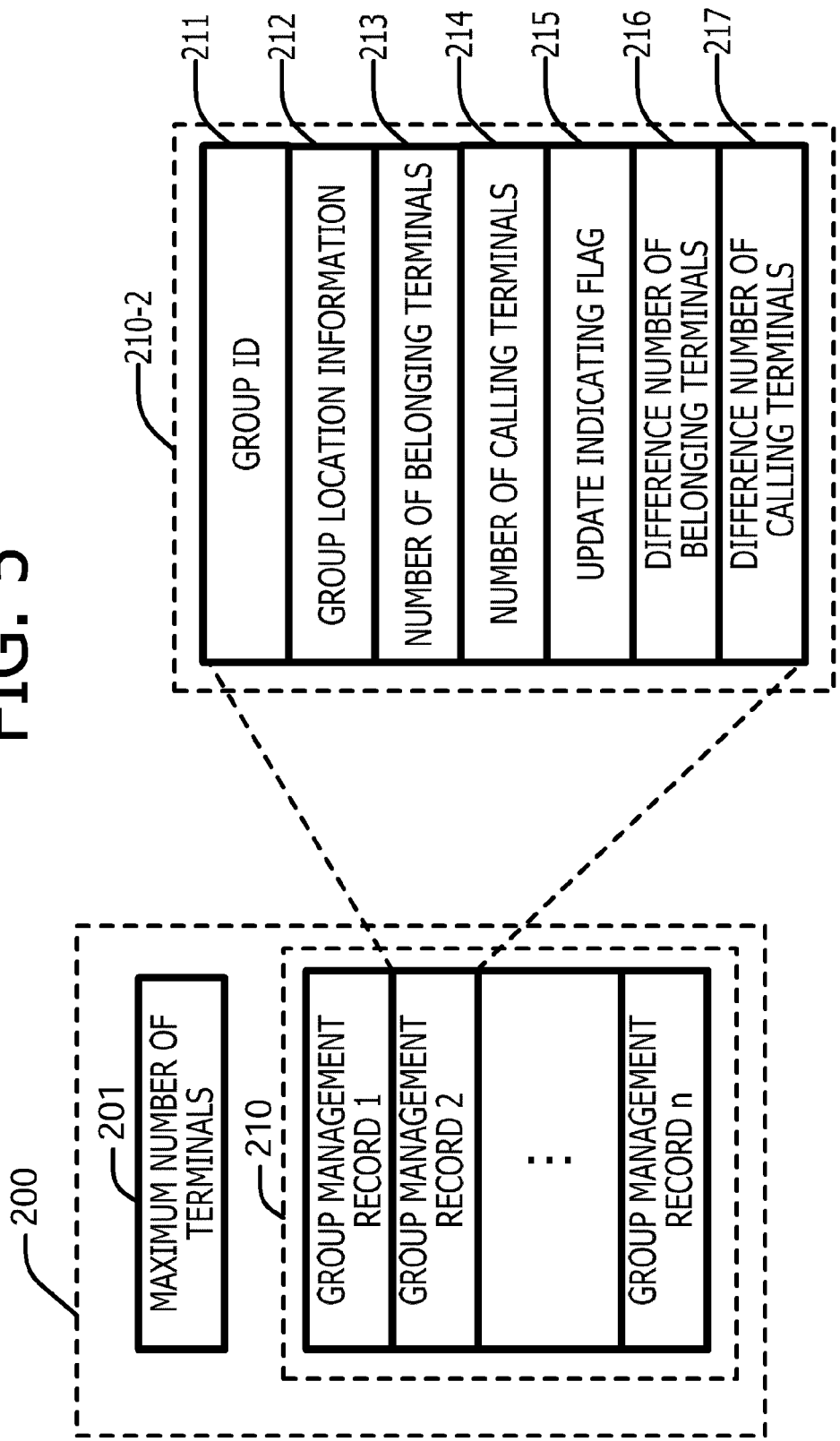
FIG. 5 is a diagram illustrating an example of a configuration of a group management DB, according to an embodiment.

FIG. 5 is a diagram illustrating an example of a configuration of a group management DB, according to an embodiment.

The group management DB 200 can be, for example, configured to include the maximum number of users 201 and a block of group management records (including n group management records as depicted in FIG. 5) 210, each storing information necessary for group management, such as a configuration of each group, in association with each group.

The maximum number of terminals 201 is an upper limit value of the number of user terminals constituting a group, and each group is configured to consist of terminals the number of which is less than or equal to a value represented by this maximum number of terminals 201. It is preferable to set the maximum number of terminals 201 to a degree which allows making determination by sight as to whether or not there exists a user making a phone call within the same group, for example, to a degree of approximately "thirty" terminals.

The group management record block 210 stores information necessary for group management, such as a configuration and a condition of each group, as a group management record for each of groups. The group management record can be configured to include a group ID 211, group location information 212, the number of belonging terminals 213, the number of calling terminals 214, a update indicating flag 215, a difference number of belonging terminals 216, and a difference number of calling terminals 217, for each of created groups.

The group ID 211 stores a value which can uniquely specify each group. In order to prevent duplicating of the group IDs, even after a group is deleted, the same group ID of the deleted group is treated so as not be reused. An example of a generation method of a group ID 211 will be described below with reference to FIG. 7.

The group location information 212 stores location information associated with a terminal owned by a representative user who has created the group. This group location information is used for a determination as to whether or not a user terminal which desires to join the group is located close to the location of the terminal owned by the representative user, which has been registered at the time when the group was created.

The number of belonging terminals 213 stores the number of terminals belonging to the group. At a time when the group is created, "1" is set since only one terminal owned by a representative user belongs to the group, and subsequently, incrementing or decrementing is performed thereon in accordance with addition or deletion of user terminals.

The number of calling terminals 214 stores the number of terminals which are currently making phone calls within the group. At a time when the group is created, "0" is set since there is no terminal making a phone call, and subsequently, incrementing or decrementing is performed thereon in accordance with further beginnings or completions of phone calls made by the belonging terminals.

The update indicating flag 215 stores flag information on whether or not group management records were updated. "ON" is set to the update indicating flag 215 when any pieces of data associated with the relevant group are updated subsequent to an immediate previous transmission of data to group management apparatuses (group management servers) of different service providers. Groups each having "ON" flag will be targets for transmission at a next transmitting timing. "OFF" is set to the update indicating flag 215, as an initial value thereof.

The difference number of belonging terminals 216 stores a difference value of the number of belonging terminals changed subsequent to the immediate previous transmitting of data to the group management servers of different service providers. That is, when the number of belonging terminals increases, a difference number with a positive sign is stored, and when the number of belonging terminals decreases, a difference number with a negative sign is stored. In the case, "0" is set as an initial value thereof.

The difference number of calling terminals 217 stores a difference value of the number of calling terminals changed subsequent to an immediate previous transmitting of data to the group management servers of different service providers. That is, when the number of calling terminals increases, a difference number with a positive sign is stored, and when the number of calling terminals decreases, a difference number with a negative sign is stored. In the case, "0" is set as an initial value thereof.

FIG. 6 is a diagram illustrating an example of a group management record block, according to an embodiment, in which the group management record block 210 is represented in a table format having lines each listing values included in the corresponding group management record.

Figure 7:
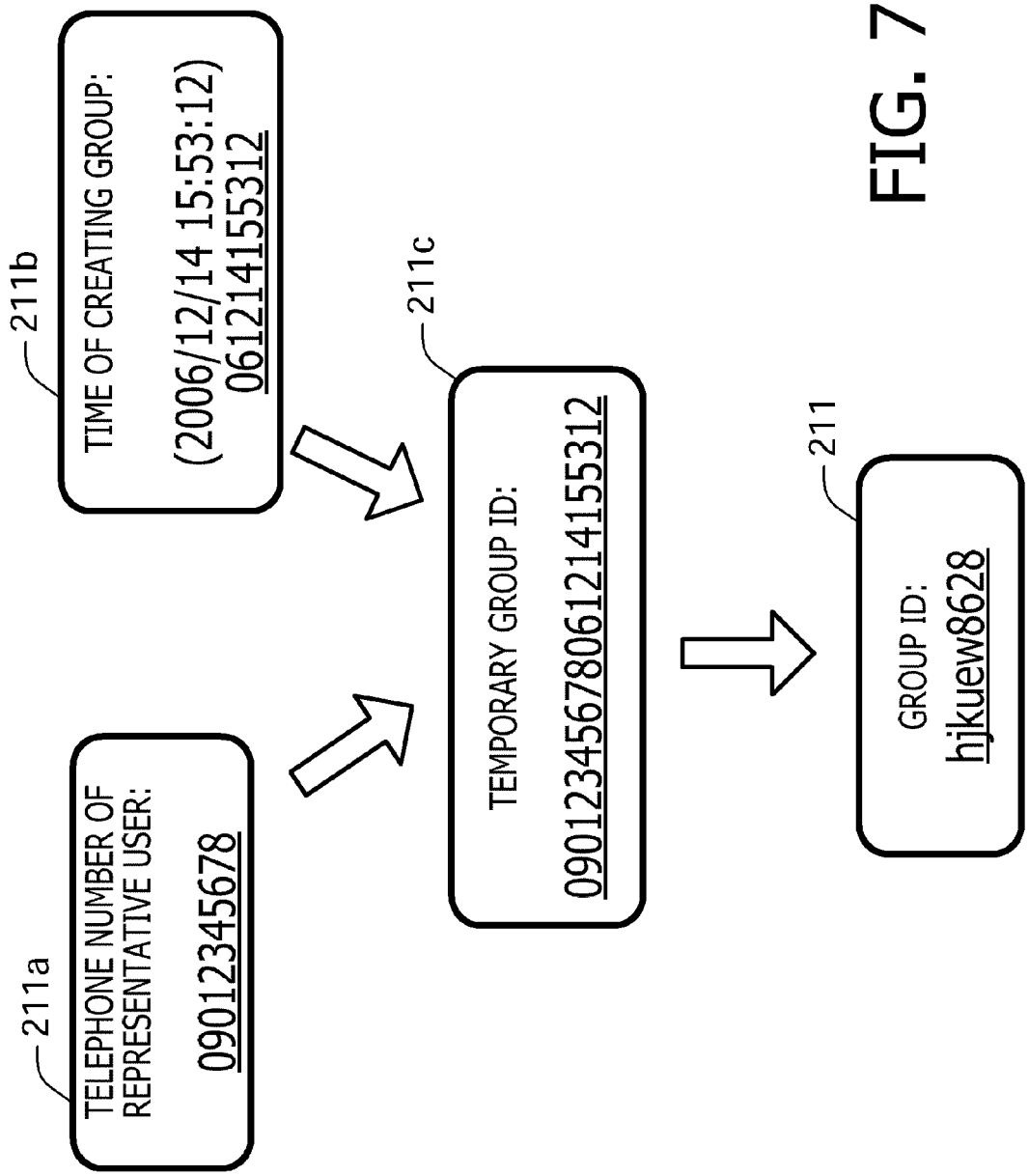
FIG. 7 is a schematic diagram illustrating an example of a generation method of a group ID used for identification of a group, according to an embodiment.

FIG. 7 is a schematic diagram illustrating an example of a generation method of a group ID used for identification of a group, according to an embodiment.

Here, a temporary group ID 211c is generated on the basis of a telephone number 211a of a representative user and time information 211b corresponding to the timing when the group was created, so as to prevent generation of duplicated group IDs. Thereafter, a group ID 211 is generated by encrypting the temporary group ID 211c, so as to prevent disclosure of the telephone number of the terminal, which is a piece of private information associated with the representative user, to a general public.

Figure 8:
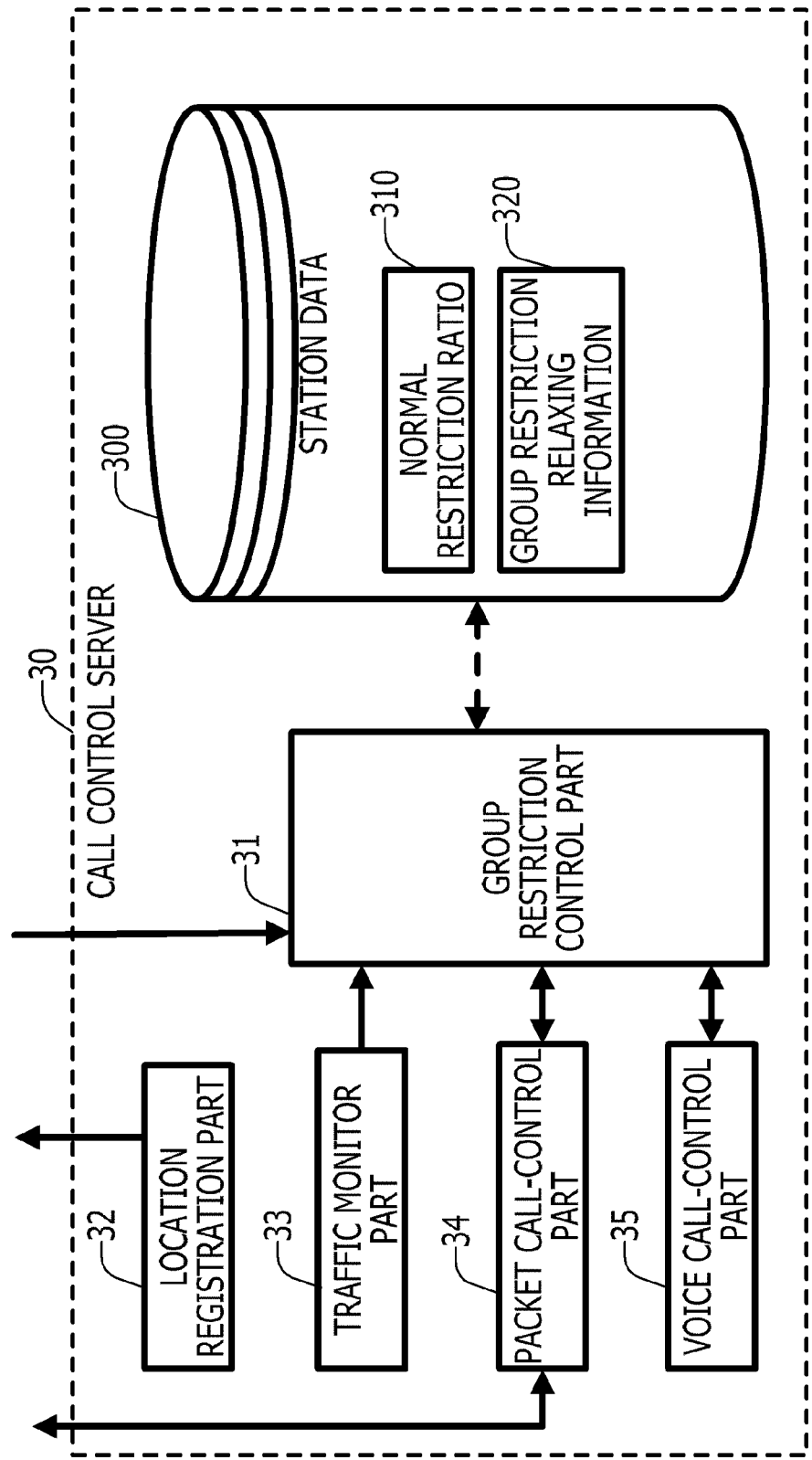
FIG. 8 is a diagram illustrating an example of a configuration of a call control apparatus, according to an embodiment.

FIG. 8 is a diagram illustrating an example of a configuration of a call control apparatus, according to an embodiment.

A call control server 30, used as a call control apparatus, can be configured to include a group restriction control part 31, a location registration part 32, a traffic monitor part 33, a packet call-control part 34, a voice call-control part 35, and station data 300.

The location registration part 32 notifies a group management server 20 of location information associated with a terminal of a user when a location of the user is registered in conjunction with a movement of the user.

The traffic monitor part 33 notifies the group restriction control part 31 of traffic information associated with the communication network (for example, information indicating that one hundred users are initiating call connection requests during one minute, or the like).

The group restriction control part 31 determines whether restriction on call connections is to be invoked or not, on the basis of the traffic information notified from the traffic monitor part 33. Further, in the case where the restriction is invoked, a restriction ratio for each group is calculated on the basis of a normal restriction ratio 310 and group restriction relaxing information 320, and the calculation result is notified to the packet call-control part 34 and the voice call-control part 35. The packet call-control part 34 and the voice call-control part 35 perform restriction processing on the basis of the notified restriction ratio.

The station data 300 retains the normal restriction ratio 310 and the group restriction relaxing information 320.

The normal restriction ratio 310 is a restriction ratio applied to terminals which are not grouped, and for example, in the case of a 90%-restriction ratio, one out of ten call connection requests is accepted.

As will be described below with reference to FIGS. 9 and 10, the group restriction relaxing information 320 retains information necessary for restriction control for each group, such as configuration information, a group restriction relaxing ratio, and the maximum number of calling terminals, by classifying the information on the basis of group-size ranges. Here, the maximum number of calling terminals means the maximum number of terminals allowed to make phone calls. In the case where a call-originating terminal exists within a restriction-invoked region, the group restriction control part 31 relaxes a restriction ratio in accordance with a group-size range matching a group to which the call-originating terminal belongs. In this case, the number of terminals allowed to make phone calls for each group is restricted in accordance with the group-size range matching the group. Further, in the case where a call-receiving terminal exists within a restriction-invoked region, the restriction relaxing control is performed in a similar way to that described above.

Figure 9:
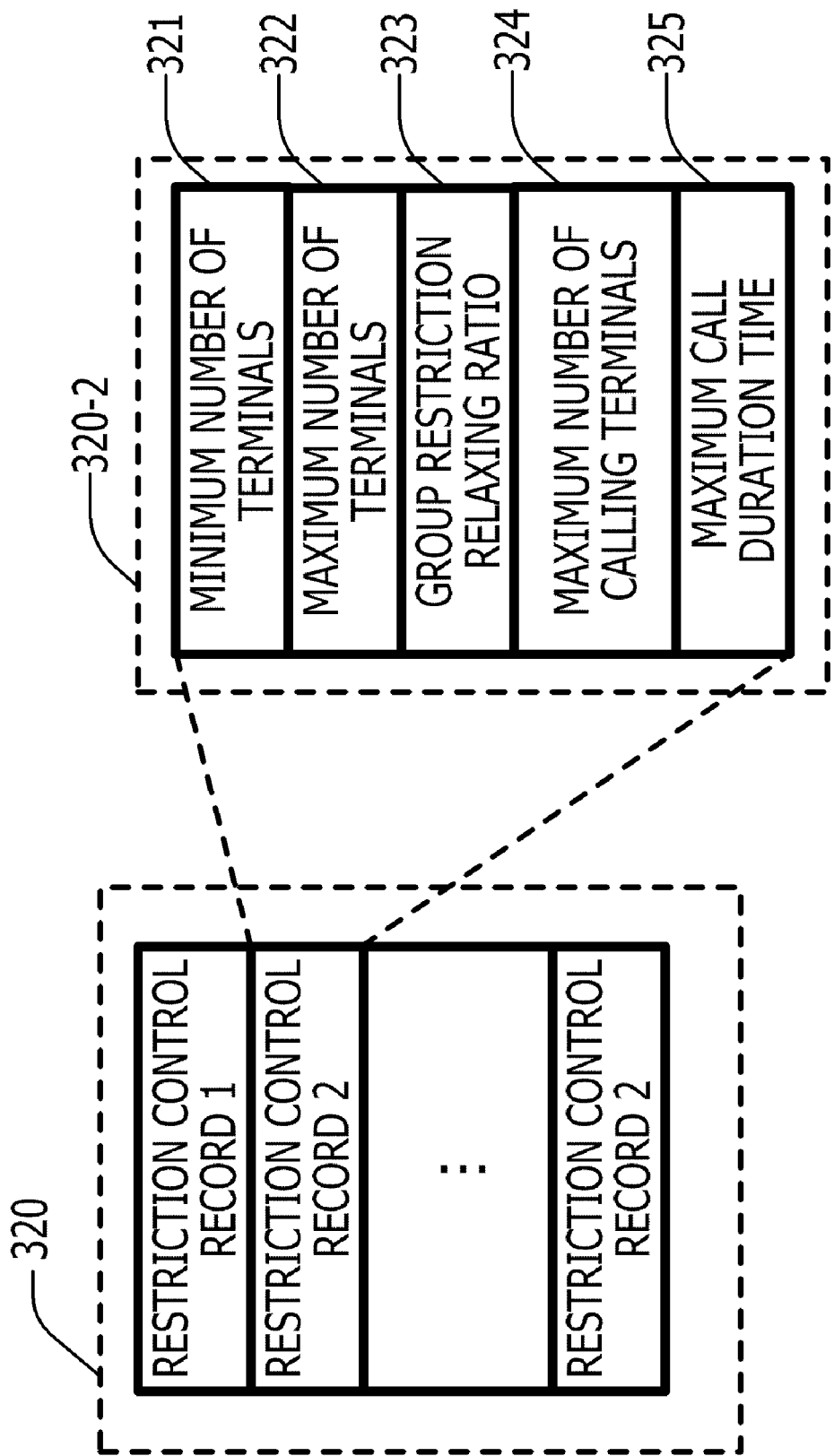
FIG. 9 is a diagram illustrating an example of a configuration of group restriction relaxing information held in station data of a call control apparatus, according to an embodiment.

FIG. 9 is a diagram illustrating an example of a configuration of group restriction relaxing information held in station data of a call control apparatus, according to an embodiment.

The group restriction relaxing information 320 can be configured as a block of restriction control records each being provided for one of group-size ranges, and each of the restriction control records can be configured to include, for example, the minimum number of terminals 321, the maximum number of terminals 322, a group restriction relaxing ratio 323, the maximum number of calling terminals 324, and the maximum duration time of a call 325.

The minimum number of terminals 321 and the maximum number of terminals 322 are used for defining a group-size range. For example, in the case of an example depicted in FIG. 10, in which the group restriction relaxing information is set, a group having a value "6" as the number of belonging terminals is classified into a group-size range A, and a group having a value "25" as the number of belonging terminals is classified into a group-size range D, in accordance with group sizes thereof. Further, in the case where the number of belonging terminals associated with a group is too small for the group to belong to any one of group-size ranges (in FIG. 10, the case where the number of belonging terminals is less than or equal to three), the restriction control similar to restriction control of terminals each belonging to no group, can be performed.

The group restriction relaxing ratio 323 is a value representing, in percentage terms, a degree which allows relaxing of restriction, and on the basis of this group restriction relaxing ratio and the normal restriction ratio, a group restriction ratio can be calculated as follows:

(a group restriction ratio)=(a normal restriction ratio)×
[100−(a group restriction relaxing ratio)]

For example, in the case where a terminal, which belongs to a group matching a group-size range B depicted in FIG. 10, initiates a call in a 90%-restriction invoked region, a group restriction ratio after relaxing of restriction is: 90×(100−50) =45%. In the same way, in the case of a group matching a group-size range D, the group restriction ratio becomes 0%, and a call-originating terminal can certainly perform communication, provided that there are no terminals making communication other than the call-originating terminal.

The maximum number of calling terminals 324 is the number of terminals which are allowed to simultaneously make phone calls. In general, "1" is set thereto, and taking into account the group size and performance of the communication network, just like the classes E to H depicted in FIG. 10, it is possible to set a value more than or equal to "2" thereto.

The maximum call duration time 325 stores the maximum call duration time with respect to terminals which are allowed to make phone calls by restriction relaxing. In the case where a call duration time from the beginning of the call exceeds the maximum call duration time, a guidance message notifying that the allowed call duration time elapses, can be announced to both the calling party side user and the called party side user, and then the call is forcedly disconnected. In the example depicted in FIG. 10, the same value is set in all classes; however, respective values to be set can be changed in accordance with group sizes.

FIG. 10 is a diagram illustrating an example of values set as group restriction relaxing information, according to an embodiment.

Here, the group restriction relaxing information is depicted, for convenience of explanation, as a table which is formatted so as to have lines each including individual values of restriction control records. FIG. 10 illustrates restriction relaxing information associated with eight group-size ranges A, B, C, D, E, F, G and H which are classified on the basis of group sizes.

Figure 11:
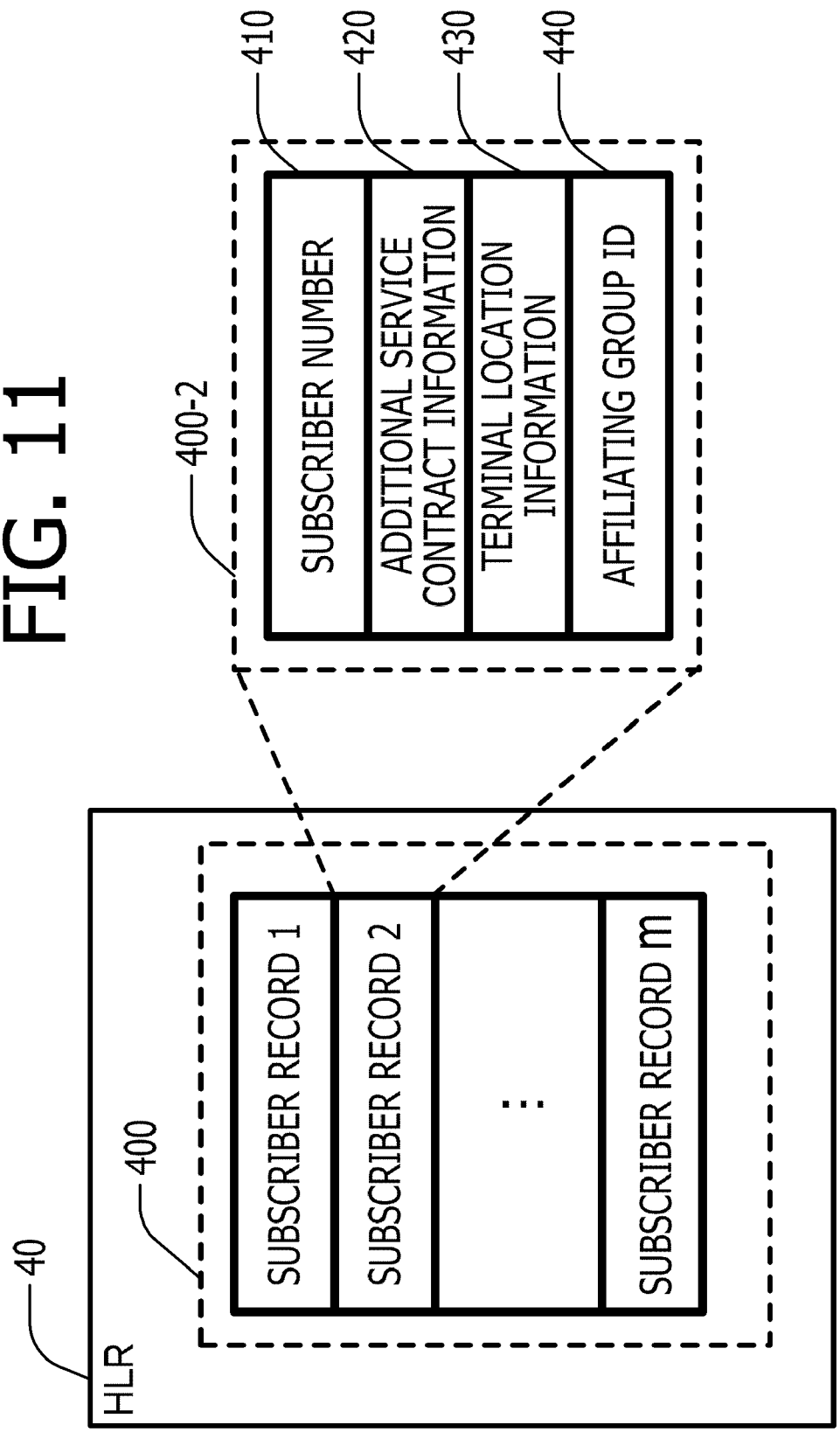
FIG. 11 is a diagram illustrating an example of a configuration of a subscriber management DB held in a HLR, according to an embodiment.

FIG. 11 is a diagram illustrating an example of a configuration of a subscriber management DB held in a HLR, according to an embodiment.

A subscriber management DB 400 can be configured to be stored in a HLR 40, and can be configured as a block of subscriber records each provided for a subscriber who is a user of a terminal.

Each of the subscriber records can be configured to include, for example, a subscriber number 410, additional service contract information 420, terminal location information 430, and an affiliating group ID 440.

The affiliating group ID 440 is a piece of information to realize the group restriction control according to the embodiment, and a group ID of a group to which a terminal owned by a user (a subscriber) identified by the subscriber number 410 is belonging, is set thereto. Here, for a user terminal which belongs to no groups, an invalid value which is a value not used as the group IDs, such as "0", can be set thereto.

Figure 12:
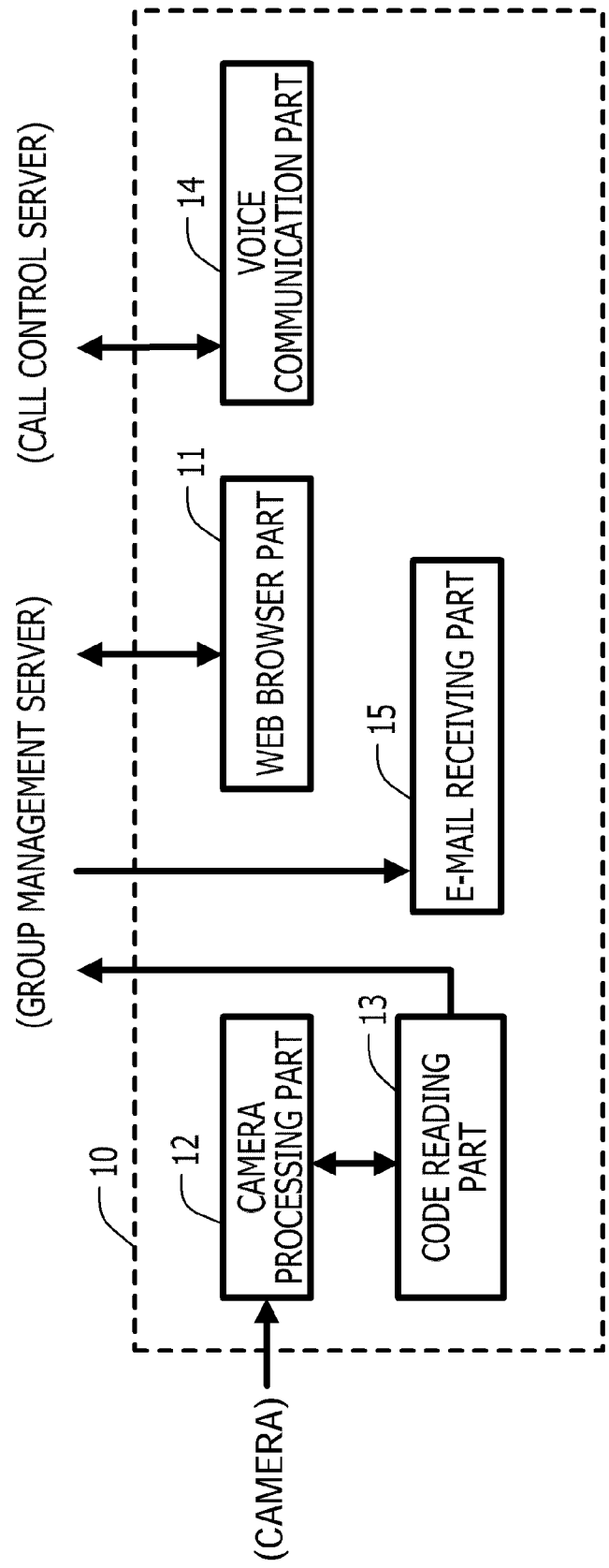
FIG. 12 is a diagram illustrating an example of a configuration of a terminal, according to an embodiment.

FIG. 12 is a diagram illustrating an example of a configuration of a terminal, according to an embodiment.

A terminal 10, which is used by a user in a restriction control system, can be configured to include, for example, a Web browser part 11, a camera processing part 12, a code reading part 13, a voice communication part 14, and an e-mail receiving part 15.

The Web browser part 11 is a part used, for example, when creating a new group or when performing an addition and a deletion of users by using a terminal equipped with no function of reading codes, and is used for transmitting and receiving data to/from the group management server 20.

By reading in a QR code displayed on a screen of a terminal owned by a different user via the camera processing part 12, the code reading part 13 automatically accesses a Web site (the group management server 20) in accordance with a URL included in the QR code, so as to transmit a group ID included in the QR code to the group management server 20. In this way, it is possible to perform an addition of a new user terminal to a group by easy operations.

The voice communication part 14 performs a process of making communication in voice between user terminals.

When a terminal owned by the user gets away from a registered location of the affiliating group to which the terminal belongs in conjunction with a movement of a user, the e-mail receiving part 15 receives and displays a message transmitted from the group management server 20, which notifies that the terminal has been deleted from the group.

As a terminal depicted in FIG. 12, for example, a mobile phone can be used; however, a fixed phone can be also used as a terminal by making a registration of groups and terminals with the group management server 20 in other ways. In this case, for example, by creating and registering a group consisting of immediate neighbors living in the same region in advance, restriction invoked to a fixed terminal owned by a representative of the group is relaxed, thereby effectively performing communication under the condition where a disaster or the like has occurred.

Figure 13A:
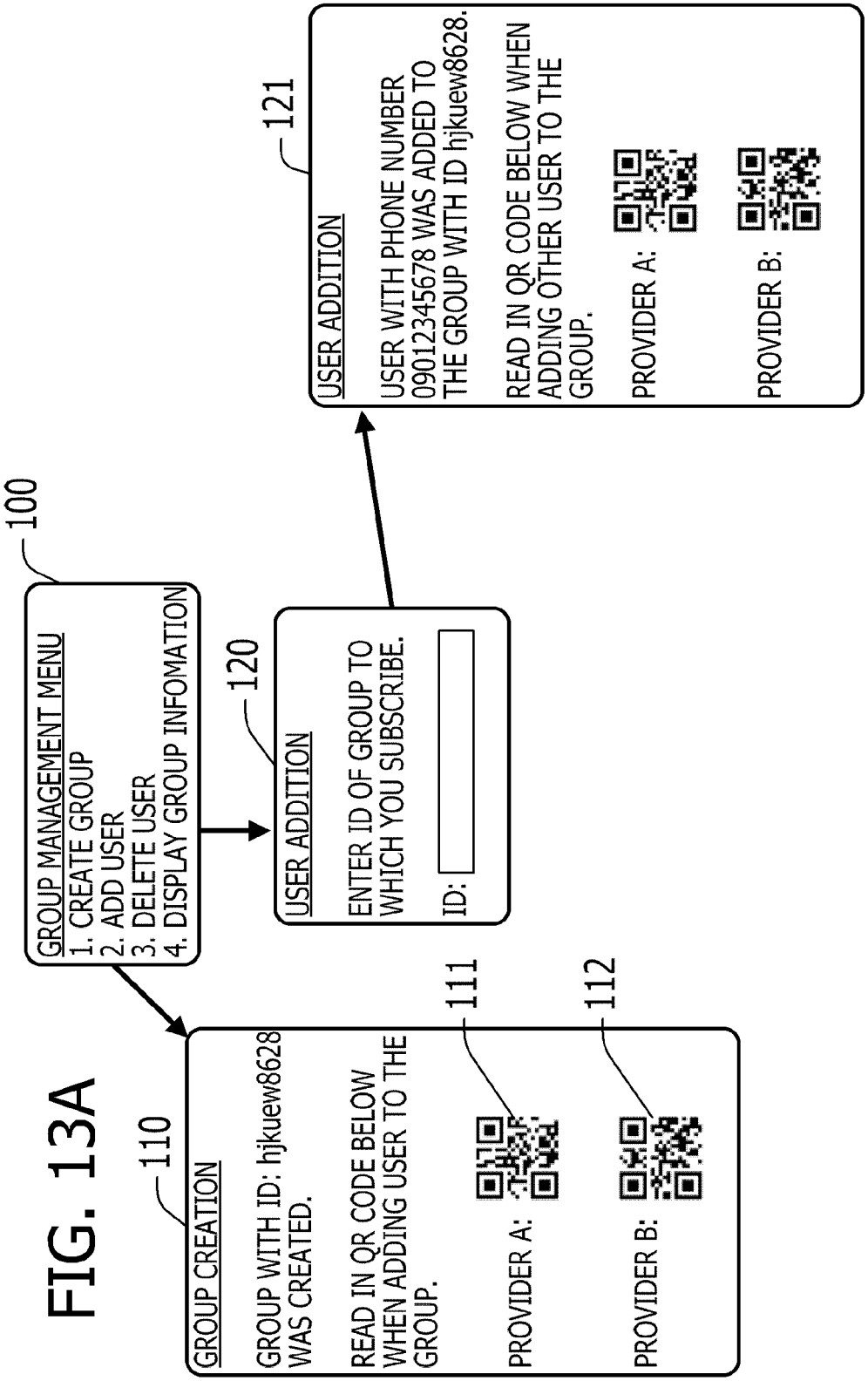
FIGS. 13A and 13B are diagrams illustrating an example of a user interface, according to an embodiment.
Figure 13B:
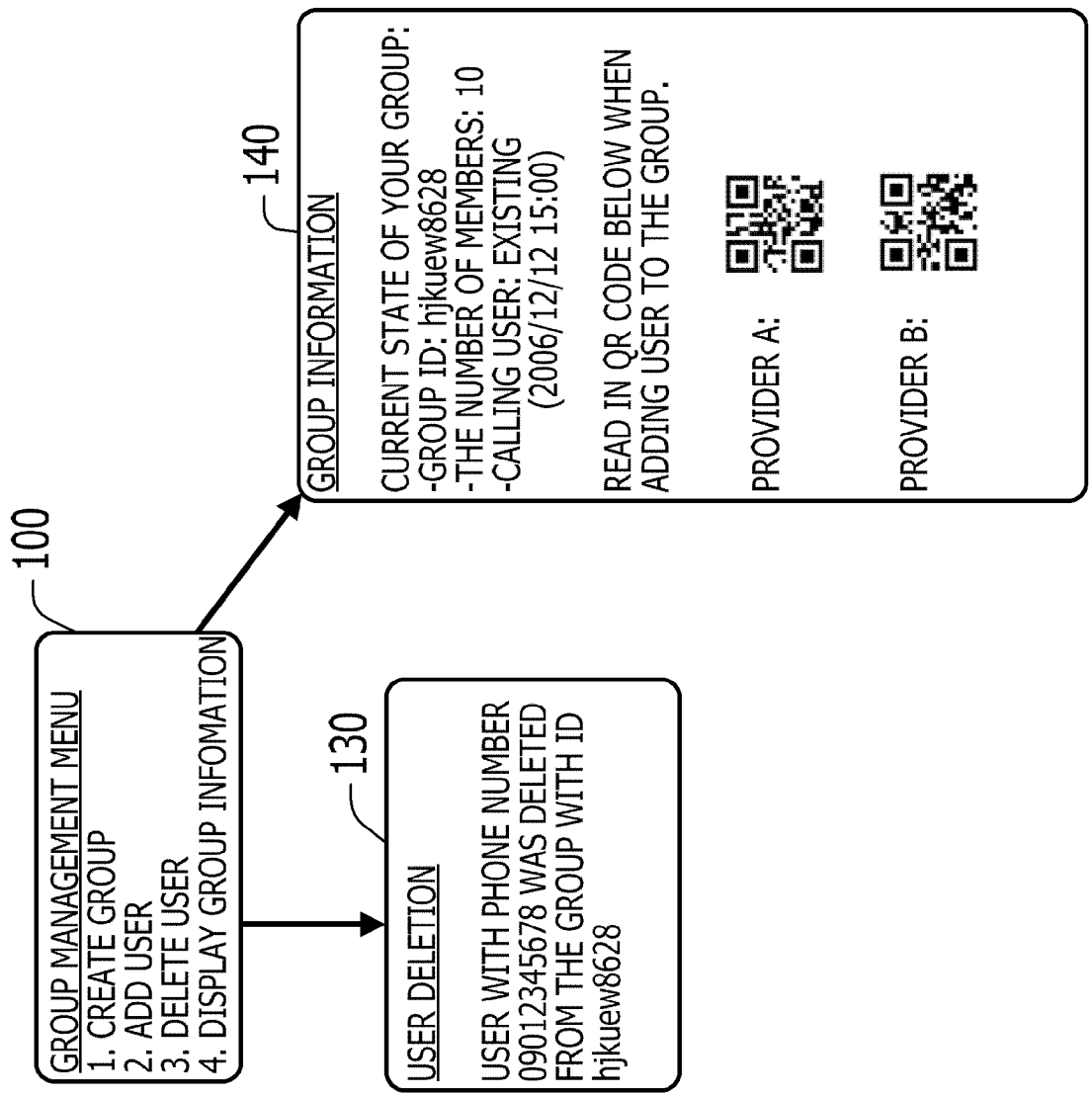

FIGS. 13A and 13B are diagrams illustrating an example of a user interface, according to an embodiment, in which a user uses, as a terminal, a mobile phone incorporating a function of camera and screen images displayed on the terminal is depicted.

In this example, the group management server 20 transmits and receives data used for group management to/from the mobile phone 10 owned by a user via the Web application part 24. The group management server 20 performs creation and deletion of groups, addition and deletion of terminals, and displaying of group information via the Web application part 24, in conjunction with the Web browsing part 11 included in the terminal 10.

An example of transitions of screens displayed on the terminal will be described below.

A screen 100 is a main screen for a group management function, and transitions of screen from the screen 100 to screens 110, 120, 130 and 140 are performed by the user's selection of respective menu items 1, 2, 3, and 4 displayed on the screen 100.

The screen 110 is displayed when a group creating process performed by the group management server 20 has completed after the menu item 1 was selected on the screen 100. At this time, QR codes 111 and 112, each including a URL of a Web site of the group management server 20 and a piece of group ID information, are displayed on the screen independently for each service provider. By utilizing QR codes, terminals owned by other users can be easily added to the group by only reading in the QR codes using a camera incorporated in the mobile phone.

The screen 120 is invoked when the menu item 2 is selected, and used for manually inputting a group ID of a group to which a terminal is to be added. For example, the screen 120 is used when the QR codes cannot be utilized because the terminal to be added does not have a camera therein.

The screen 121 is displayed upon completing addition of a terminal to a group which was invoked by an input operation of the screen 120. In this case, the QR codes used for accessing the group management servers are displayed in the same way as that in the case of the screen 110.

The screen 130 is displayed upon deletion of a user terminal from a group after the menu item 3 was selected on the screen 100, and, for example, a group ID and a telephone number of the user are displayed thereon, as depicted in FIG. 13B.

The screen 140 is invoked when the menu item 4 is selected on the screen 100, and displays information associated with a group including a user terminal that has accessed the Web site of the group management server. At the same time, the QR codes used for accessing the Web sites are displayed in the same way as that in the case of the screen 110.

When creating a new group, a terminal owned by a user who is a representative of the group accesses a Web site of the group management server provided by a service provider. Subsequently, registration of the group and addition of a user are performed by using a camera incorporated in a terminal, or by key manipulations, via user interfaces such as the screens 100, 110 and 120 depicted in FIG. 13A which are provided by the Web application part 24 of the group management server 20. At this time, in the group management DB 200, location information indicating a location at which a terminal owned by a representative of the group exists at a time when the group is created, is registered as group location information of the group.

Figure 14:
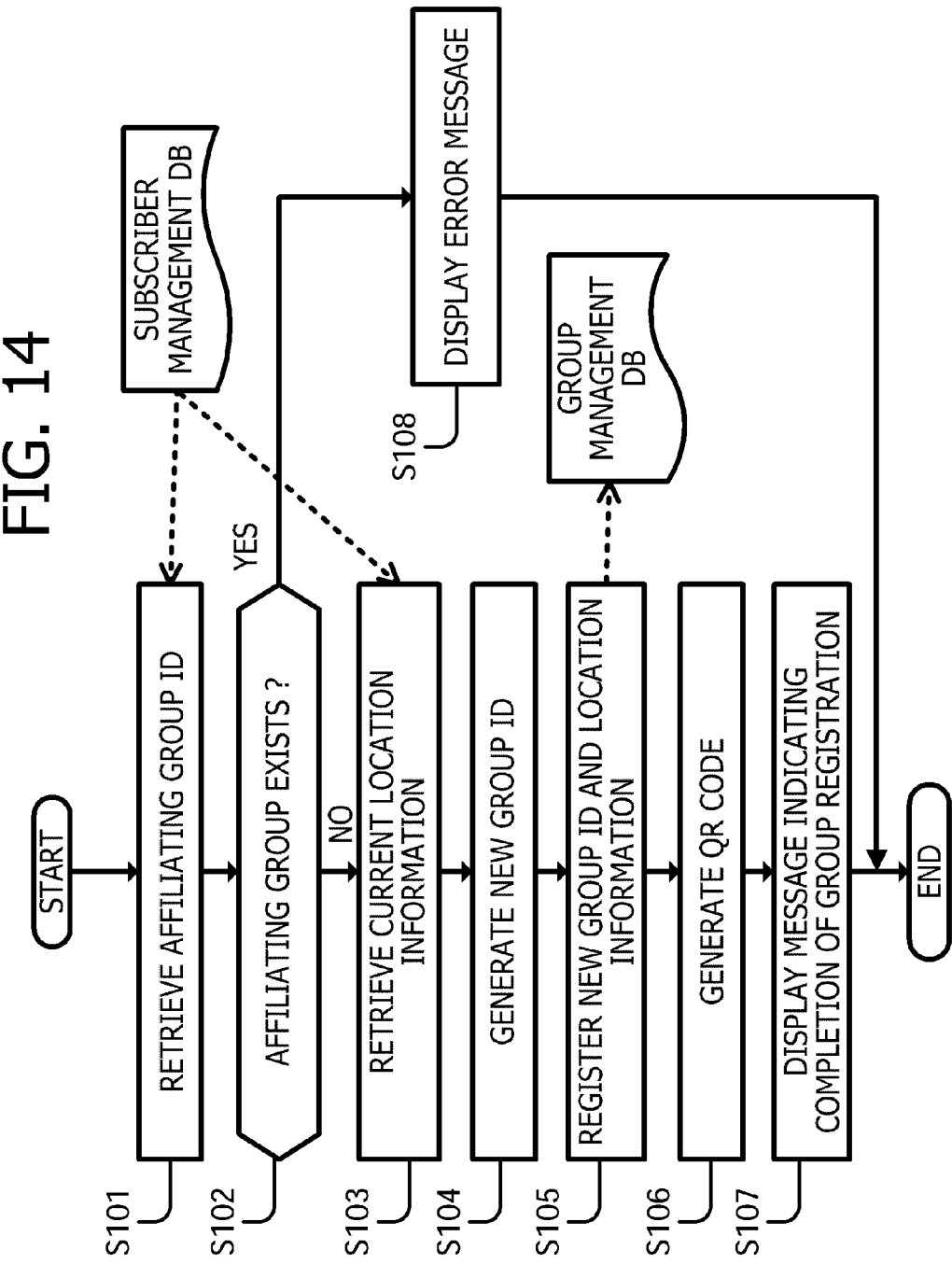
FIG. 14 is a diagram illustrating an example of an operational flowchart of a group management apparatus, according to an embodiment.

FIG. 14 is a diagram illustrating an example of an operational flowchart of a group management apparatus, according to an embodiment, in which a group creation request is transmitted from a terminal to a group management server 20.

In step S101, the group management server 20 searches the subscriber management DB 400 in the HLR 40, and retrieves an affiliating group ID from a subscriber record associated with the terminal from which a group creation request is transmitted.

In step S102, it is determined whether or not there exists a corresponding affiliating group to which the terminal belongs. For example, it is determined that there exists an affiliating group when the value of the affiliating group ID which was retrieved in the above step S101 is different from an initial value "0" representing that "there exist no affiliating groups". When there exists a corresponding affiliating group, that is, the relevant terminal belongs to an existing group (YES), the flow proceeds to step S108, and otherwise (NO), the flow proceeds to the next step S103.

In step S103, terminal location information is retrieved from a subscriber record associated with the relevant terminal (or user), in the subscriber management DB 400.

In step S104, a new group ID is generated. When generating the new group ID, for example, by employing the method described with reference to the foregoing FIG. 7, the new group ID different from the existing group IDs can be generated.

In step S105, a new group management record, into which the generated group ID and the group location information are written, is added and registered in the group management DB 200 of the group management server 200.

At this time, as initial values, for example, the following values can be set: "1" to the number of belonging users, "0" to the number of users making phone calls, "1" to the number of belonging terminals, "0" to the number of calling terminals, "OFF" to the update indicating flag, "0" to the difference number of belonging terminals, and "0" to the difference number of calling terminals.

In step S106, the QR codes, which includes the group ID generated in the above step S104 and URLs of group management sites of all service providers, can be generated.

In step S107, the group management server 20 displays on the terminal via the Web application part 24, a message notifying completion of registration of the group as well as the QR codes generated in the above step S106, for example, in the same way as that of the screen 110 depicted in FIG. 13A, and then terminates the processing. These QR codes can be used every time new terminals are added to the same group.

In step S108, since it is determined that the terminal already belongs to an existing group, the group management server 20 displays on the terminal via the Web application part 24, a error message notifying that the terminal is not permitted to simultaneously belong to a plurality of groups at the same time, and then terminates the processing.

As mentioned above, prompt generation of a group can be performed by accessing the group management server 20 using a terminal incorporating a Web browsing function therein (for example, a mobile terminal), in response to a group creation request from a user terminal.

Figure 15:
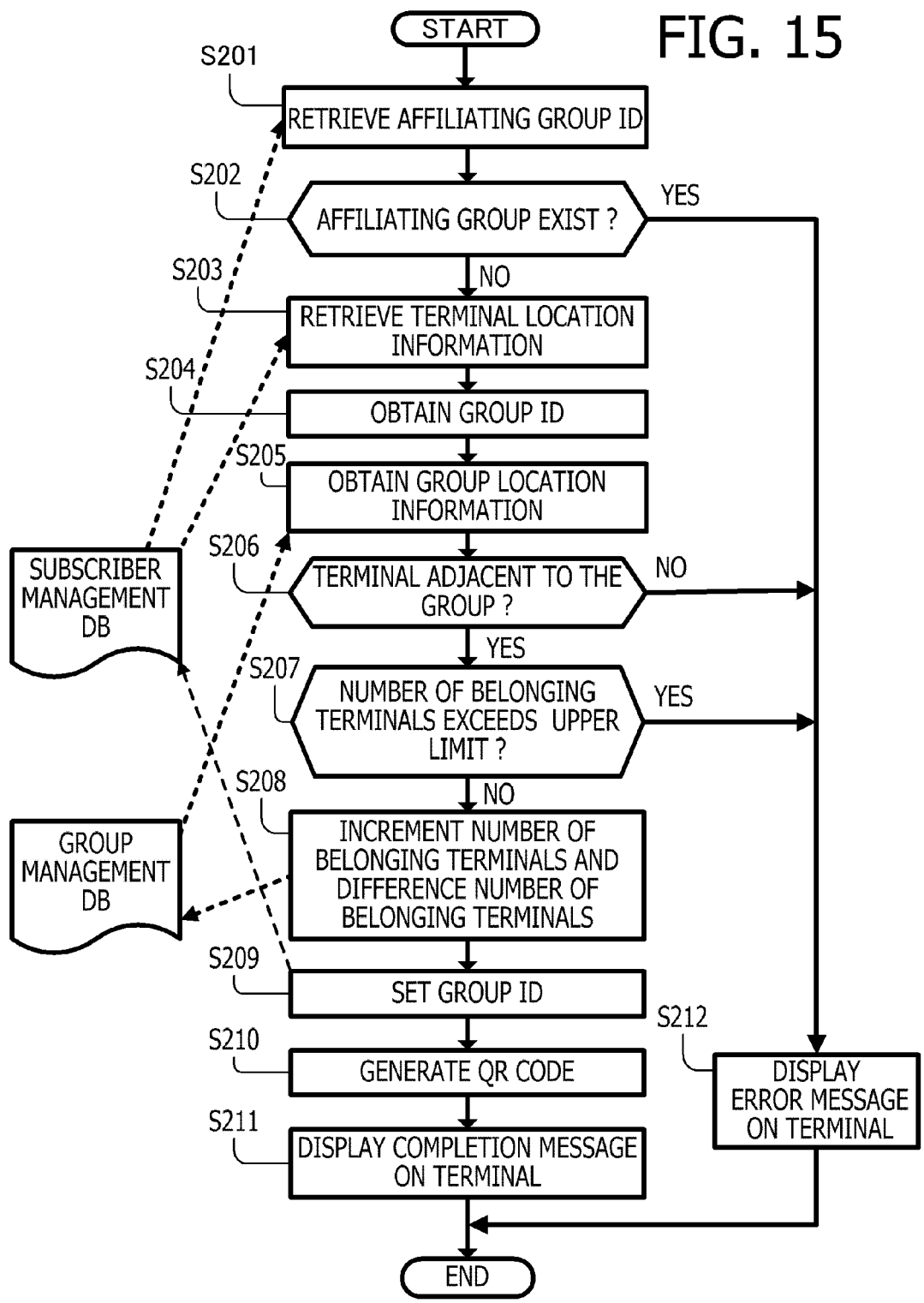
FIG. 15 is a diagram illustrating an example of an operational flowchart of a group management apparatus, according to an embodiment.

FIG. 15 is a diagram illustrating an example of an operational flowchart of a group management apparatus, according to an embodiment, in which a terminal addition request is transmitted from a user terminal to a group management server 20.

Addition of a terminal to a group can be performed, for example, as below. A terminal to be added to the group read in the QR codes (111 and 112 depicted in FIG. 13) displayed on another terminal already belonging to the group, by using a camera incorporated in the terminal to be added, and accesses a group management server of the service provider whom the user owing the terminal contracts with. In this case, the screen 121 can be directly displayed not via the screens 100 and 120 depicted in FIG. 13A.

In the case of a terminal not having a function of reading the codes, "add user" is selected in the main menu of the screen 100 depicted in FIG. 13A, and then, a request for adding a terminal owned by the relevant user is made by manually inputting the group ID on the screen 120 so as to transmit a terminal addition request to a group management server 20.

In step S201, upon receiving a terminal addition request, the group management server 20 searches the subscriber management DB 400 in the HLR 40, and retrieves an corresponding affiliating group ID from a subscriber record associated with the relevant terminal.

In step S202, it is determined whether or not there exists a corresponding affiliating group to which the terminal belongs. For example, it is determined that there exists an affiliating group when the value of the affiliating group ID which was retrieved in the above step S201 is different from an initial value "0" representing that "there exist no affiliating groups". When there exists a corresponding affiliating group, that is, the relevant terminal belongs to an existing group (YES), the flow proceeds to step S212, and otherwise (NO), the flow proceeds to the next step S203.

In step S203, terminal location information is retrieved from a subscriber record associated with the relevant terminal, which is included in the subscriber management DB 400. Here, the retrieved terminal location information means current location information associated with the terminal to be added.

In step S204, the group management server 20 obtains, from the received terminal addition request, a group ID associated with a group to which the terminal is to be added. This group ID is included in the terminal addition request transmitted from the relevant terminal to the group management server 20. For example, in the case where a user makes a request for addition of a terminal by reading in the QR code 111 displayed on the screen 110, as depicted in the FIG. 13A, the group ID can be written into URL information which is included in a terminal addition request. Further, in the case where the user manually inputs the group ID from the screen 120, as depicted in FIG. 13A, the group ID can be transmitted as a piece of inputted form data in a terminal addition request.

In step S205, the group management server 20 searches the group management records in the group management DB 200 on the basis of the group ID obtained in the above step S204, so as to obtain group location information in a group management record pointed by the group ID. The group location information obtained here is location information of a terminal when the group was created by the terminal.

In step S206, the group management server 20 compares the group location information obtained in the above step 205, with the terminal location information associated with a terminal to be added, which was obtained in the above step S203, so as to determine whether or not the terminal is located adjacent to the group. When it is determined that the terminal is located adjacent to the group (YES), the flow proceeds to next step S207. When it is determined that the terminal is not adjacent to the group (NO), the flow proceeds to step S212. The determination as to whether or not the terminal is adjacent to the group, can be made, for example, by determining whether or not a difference between the group location information and the terminal location information is smaller than or equal to a predetermined value.

In step S207, it is determined whether or not the number of belonging terminals in a group management record pointed by the group ID obtained in the above step S204, is beyond a predetermined upper limit, that is, a value set in the maximum number of terminals 201 in the group management DB 200. When it is beyond the upper limit (YES), the flow proceeds to step S212, and otherwise (NO), the flow proceeds to next step S208.

In step S208, the group management server 20 increments by 1 the number of belonging terminals and the difference number of belonging terminals in a group management record corresponding to the group ID, in the group management DB 200.

In step S209, the group management server 20 sets the relevant group ID to a subscriber record of the subscriber management DB 400, which corresponds to the terminal to be added.

In step S210, the group management server 20 generates the QR codes, which includes the group ID and URLs of Web sites of group management servers owned by individual service providers.

In step 211, the group management server 20 transmits a message notifying completion of addition of the terminal, which includes the QR codes generated in the above step S210, to the relevant user terminal via the Web application part so that the message is displayed on the relevant terminal, and then, terminates the process. Displaying on the user terminal can be performed, for example, just like displaying on the screen 121 depicted in FIG. 13A.

In step S212, since an error is detected in the forgoing step, an error message in accordance with the kind of the error is transmitted to the relevant user terminal via the Web application part so as to be displayed thereon. Then, the process terminates.

For example, a message notifying that "simultaneously belonging to a plurality of groups is not permitted" in the case of an error resulting from the determination made in the step S202; a message notifying that "You are now located apart from the region where the group was created" in the case of an error resulting from the determination made in the step S206; or a message notifying that "the number of belonging terminals is too large" in the case of an error resulting from the determination made in the step S207, are displayed on the relevant user terminal.

Figure 16:
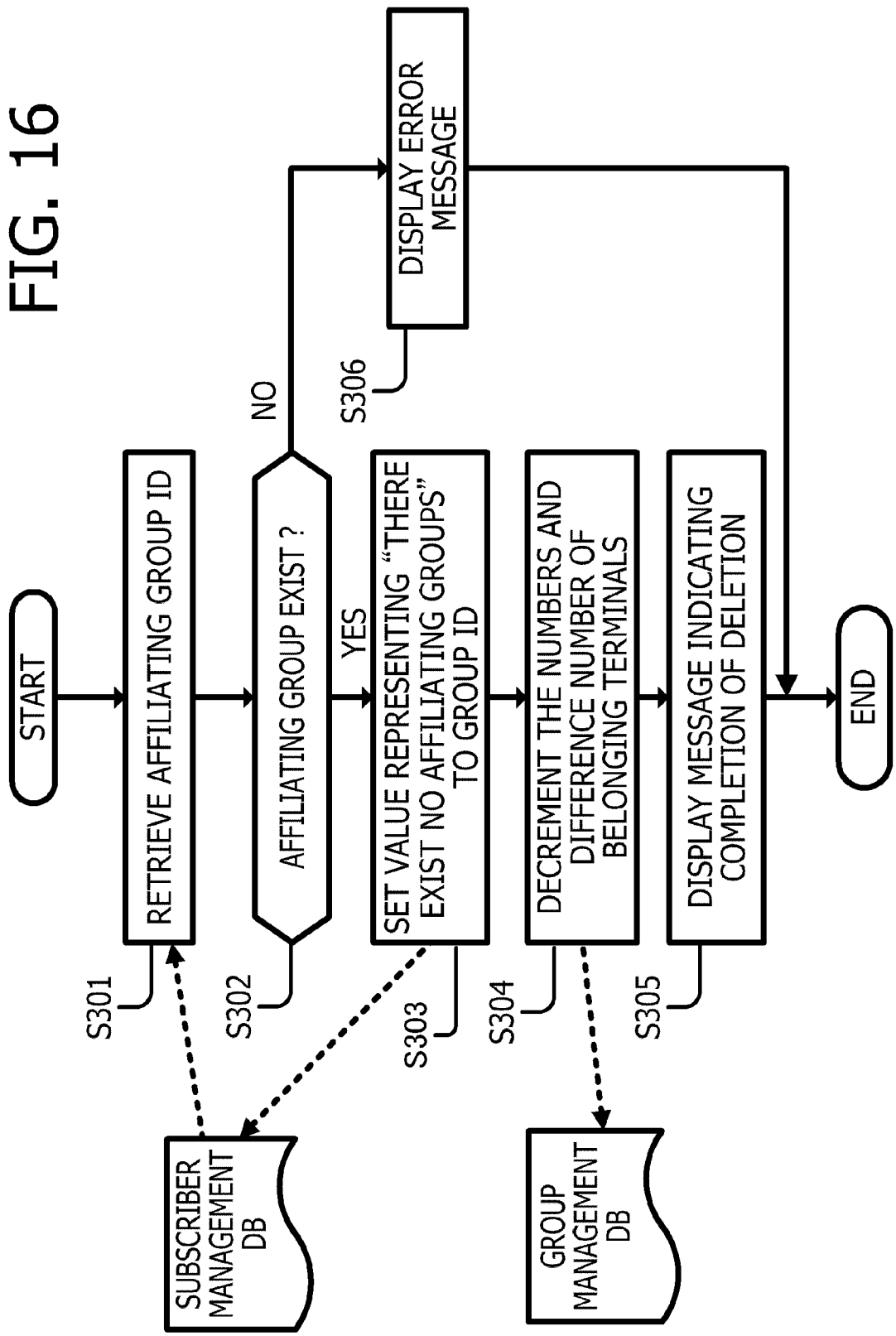
FIG. 16 is a diagram illustrating an example of an operational flowchart of a management apparatus, according to an embodiment.

FIG. 16 is a diagram illustrating an example of an operational flowchart of a management apparatus, according to an embodiment, in which a request for deleting a terminal is transmitted from a user terminal to a group management server 20.

The deletion of a terminal from a group is performed, for example, by allowing a terminal, owned by a user who desires the deletion of the terminal, to access a Web site of the group management server 20. As user interfaces therefor, the screens 100 and 130 depicted in FIG. 13A can be used.

In step S301, upon receiving a request for deleting a terminal, the group management server 20 searches the subscriber management DB 400 in the HLR 40, for a corresponding affiliating group ID in a subscriber record associated with the terminal to be deleted.

In step S302, it is determined whether or not there exists a corresponding affiliating group to which the terminal belongs. For example, it is determined that there exists an affiliating group when the value of the corresponding affiliating group ID which was retrieved in the above step S301 is different from an initial value "0" representing that "there exist no affiliating groups". When there exists a corresponding affiliating group, that is, the relevant terminal belongs to an existing group (YES), the flow proceeds to next step S303, and otherwise (NO), the flow proceeds to the step S306.

In step S303, the group ID in a subscriber record associated with the relevant terminal in the subscriber management DB 400 is set to a value representing that "there exist no affiliating groups", for example, "0".

In step S304, the group management server 20 decrements, by 1, the number of belonging terminals and the difference number of belonging terminals in a group management record corresponding to the group in the group management DB 200. Here, in the case where the number of belonging terminals becomes "0", it is necessary to delete the group itself; however, prior thereto, it is necessary to notify group management servers 20a of different service providers, of a fact that the number of terminals is reduced. For this reason, the deletion of the group is not performed here, but, as will be described with reference to FIG. 21, the deletion of the group itself is performed after transmitting the difference data associated with the group to the different service providers.

In step S305, a message notifying completion of deletion of the terminal is transmitted to the terminal, via the Web application part included in the group management server 20, so as to be displayed on the terminal, and then, the process terminates.

In step S306, since the relevant terminal currently belongs to no groups, a message indicating that the terminal cannot be deleted is transmitted to the terminal, via the Web application part included in the group management server 20, so as to be displayed on the terminal.

By using a mobile phone incorporating a function of Web browsing therein, particularly, by using a mobile phone incorporating a function of camera therein, users can perform creation of groups, and addition and deletion of terminals with easy operations as depicted in the FIGS. 14, 15 and 16. It is preferable that these operations are performed in advance under a normal communication condition where no call congestion is occurring.

In the case where a fixed phone is used as a terminal, the operations similar to those described above may not be realized. Even in such a case, if group management records are stored in the group management server 20 and updated by some methods, it is possible to achieve the group restriction control according to the embodiment under the condition where call congestion is occurring. For example, by employing other known methods, or using manpower supported by telephone, FAX, or the like, the creation of new groups and the addition and deletion of terminals into/from the group management DB 200 included in the group management server 20 may be performed.

Figure 17:
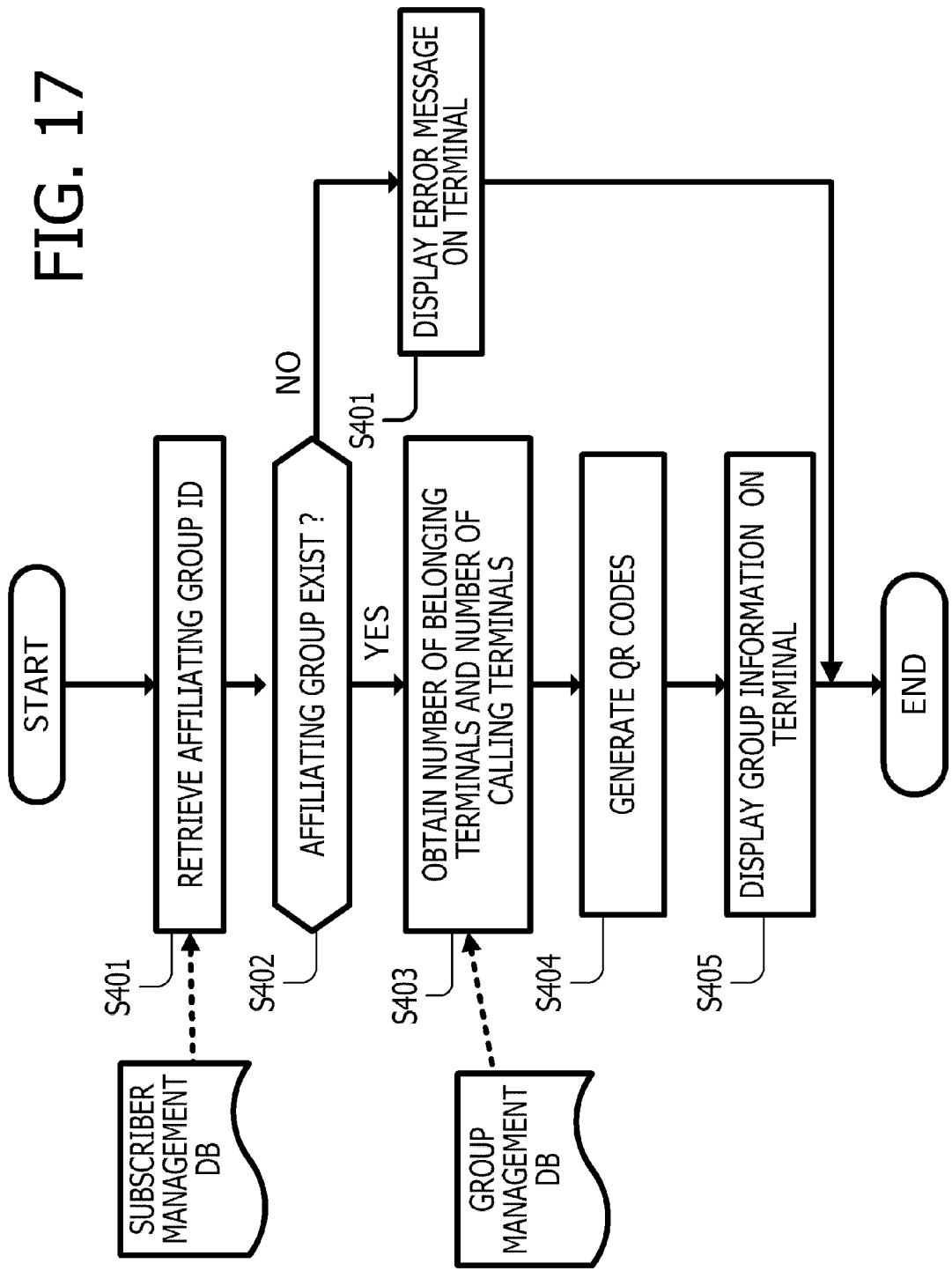
FIG. 17 is a diagram illustrating an example of an operational flowchart of a group management apparatus, according to an embodiment.

FIG. 17 is a diagram illustrating an example of an operational flowchart of a group management apparatus, according to an embodiment, in which a request for displaying group information is transmitted from a user terminal to a group management server 20.

For example, when a user belonging to any one of groups selects "display group information" from the menu screen 100 as depicted in FIG. 13B by accessing the Web site of the group management server 20, the screen 140 is displayed on a terminal, and the user can confirm a group ID of a group to which the user itself belongs, the number of members (or belonging terminals), and the presence or absence of calling users.

In step S401, upon receiving a request for displaying group information, the group management server 20 searches the subscriber management DB 400, for a corresponding affiliating group ID in a subscriber record associated with the relevant user terminal.

In step S402, it is determined whether or not there exists a corresponding affiliating group to which the terminal belongs. For example, it is determined that there exists an affiliating group when the value of the corresponding affiliating group ID which was retrieved in the above step S401 is different from an initial value "0" representing that "there exist no affiliating groups". When there exists a corresponding affiliating group, that is, the relevant terminal belongs to an existing group (YES), the flow proceeds to next step S403, and otherwise (NO), the flow proceeds to step S406.

In step S403, the group management server 20 searches the group management records in the group management DB 200 by using, as a key, the affiliating group ID retrieved in the above step S401, so as to obtain the number of belonging terminals and the number of calling terminals in a group management record corresponding to the affiliating group ID.

In step S404, the group management server 20 generates the QR codes that includes the affiliating group ID and URL information associated with the group management servers of individual service providers.

In step S405, the group management server 20 transmits a group information message that includes the QR codes generated in the above step S404, the number of belonging terminals, and the number of calling terminals, to the relevant terminal via the Web application part of the group management server 20, so as to display the group information on the relevant terminal, and then the process terminates. Displaying onto the terminal can be performed, for example, just like displaying on the screen 140 depicted in FIG. 13B.

As described above, since the number of terminals within a group, which are currently making phone calls, is displayed on the user terminal, it is possible to prevent initiation of calls for communication by other user terminals beyond the maximum number of calling terminals, and to suppress increase of load imposed on the communication network due to initiation of unnecessary call connection requests.

FIG. 18A is a diagram illustrating an example of an operational flowchart of a call control apparatus, according to an embodiment, in which a restriction is invoked at a calling party side, and processes performed by a group restriction control part 31 of a call control server 30 is depicted.

Although not depicted in this operational flowchart, the group restriction control part 31 can be configured to retain restriction invoking information representing whether or not call connection restriction at the calling party side is to be performed. The restriction invoking information can be set on the basis of current traffic condition information associated with the communication network, which is notified from the traffic monitor part 33 of the call control server 30. Further, this operational flowchart is executed by the call control server 30 at a trigger of an originating call from a user terminal.

In step S501, the call control server 30 determines whether or not the call connection restriction at the calling party side is invoked, on the basis of the restriction invoking information retained by group restriction control part 31, and when the restriction is invoked (YES), the flow proceeds to next step S502. When the restriction at the calling party side is not (NO), the flow proceeds to step 512 in FIG. 18B.

In step S502, the call control server 30 searches the subscriber management DB 400, for an affiliating group ID associated with a subscriber record corresponding to the user terminal which has initiated a call.

In step S503, it is determined whether or not there exists a corresponding affiliating group. When there exists a corresponding affiliating group (YES), the flow proceeds to next step S504. When there exist no affiliating groups (NO), the flow proceeds to step S508 in which a determination for restriction is made by using a predetermined normal restriction ratio. Here, the determination of whether or not there exists a corresponding affiliating group, can be done on the basis of a value of the affiliating group ID obtained in the above step S502. That is, when a value of the affiliating group ID is not "0", it is determined that there exist a corresponding affiliating group, and when the value of the affiliating group ID is "0", it is determined that there exist no corresponding affiliating groups.

In step S504, the call control server 30 obtain the number of belonging terminals and the number of calling terminals in a group management record corresponding to the affiliating group ID determined in the above step S503, by searching the group management records in the group management DB 200 using, as a key, the affiliating group ID.

In step S505, the call control server 30 obtains a group restriction relaxing ratio, the maximum number of calling terminals, and the maximum call duration time, on the basis of group restriction relaxing information 320 included in the station data 300 of the call control server 30 and the number of belonging terminals obtained in the above step S504.

In step S506, it is determined whether or not the number of calling terminals, which was obtained in the above step S504, is less than or equal to the maximum number of calling terminals, which was obtained in the above step S505. That is, it is determined whether or not the following formula is satisfied:

(the number of calling terminals)=<(the maximum number of calling terminals).

In the case where the number of calling terminals is less than or equal to the maximum number of calling terminals (YES), the flow proceeds to next step S507, and otherwise (NO), the flow proceeds to step S510.

In step S507, on the basis of the group restriction relaxing ratio, which was obtained in the above step S505, and the normal restriction ratio 310, which is included in the station data 300, the group restriction ratio associated with the relevant group is calculated as follows:

(a group restriction ratio)=(a normal restriction ratio)× [100−(a group restriction relaxing ratio)]/100

In step S508, it is determined whether or not the call connection request from the relevant user terminal is to be accepted.
Here, it is determined whether or not the call connection request from the user terminal is accepted, on the basis of the group restriction ratio when the flow has proceeded from the above step S507 to this step, or on the basis of the normal restriction ratio when the flow has proceeded from the above step S503 to this step.

Figure 18B:
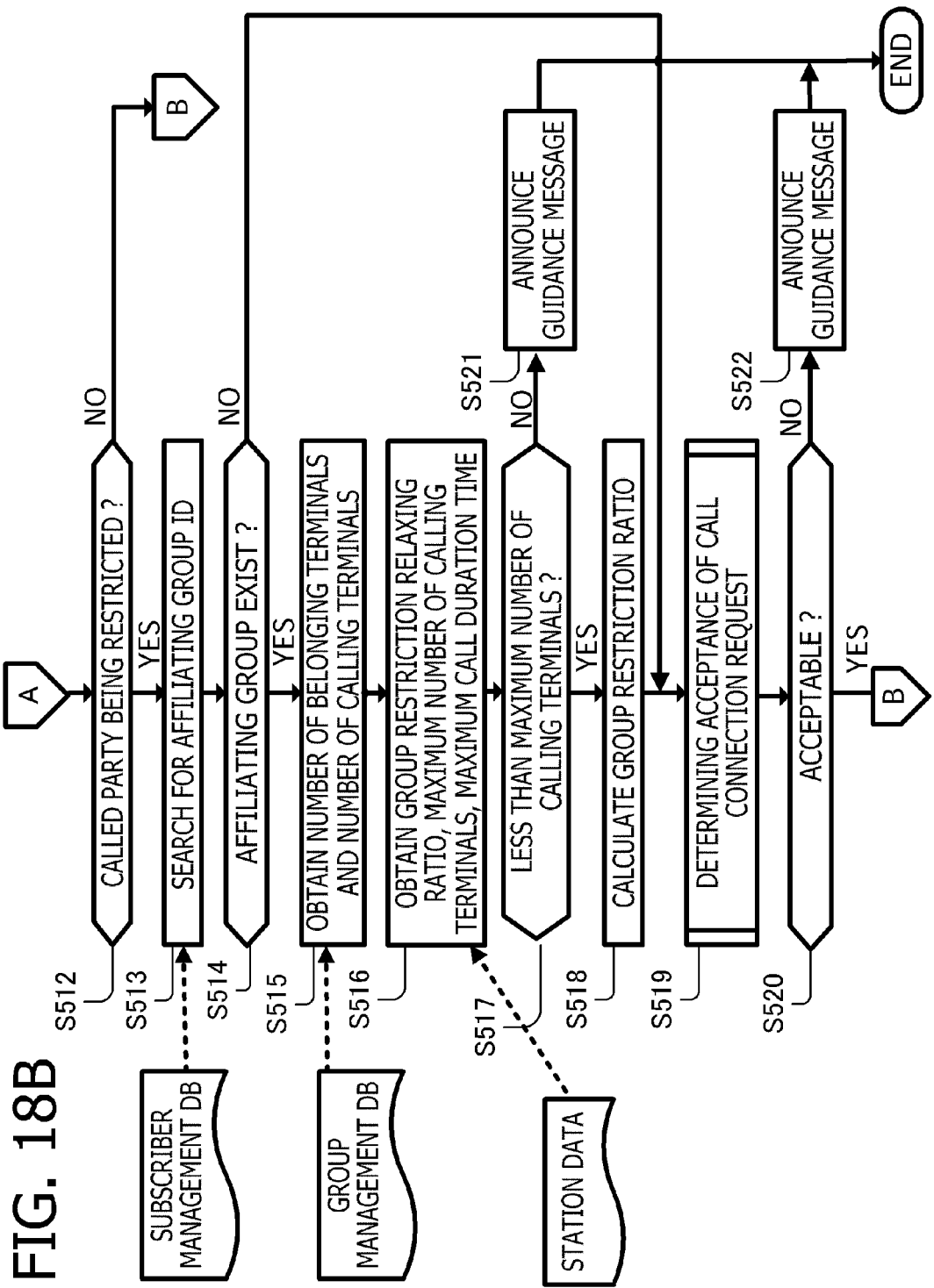

In step S509, when the result of the determination made in the above step S508 is that the call connection request is to be accepted (YES), the flow proceeds to step S512 in FIG. 18B, and otherwise (NO), the flow proceeds to step S511.

In step S510, the call control server 30 announces a guidance message notifying that the call connection request cannot be accepted because other users within the same group are making phone calls, and then, the process terminates.

In step S511, the call control server 30 announces a guidance message notifying that a call is to be attempted again after a while, and then, the process terminates.

FIG. 18B is a diagram illustrating an example of an operation flowchart of a call control apparatus, according to an embodiment, which illustrates a flowchart of processes performed by the group restriction control part 31 when restriction is being invoked at the called party side. Although not depicted in this operation flowchart, the group restriction control part 31 retains restriction invoking information representing whether or not the call connection restriction at the called party side is to be performed. The restriction invoking information can be set on the basis of current traffic condition information associated with the communication network, which is notified from the traffic monitor part 30 included in the call control server 30. Further, this process flowchart is executed subsequent to executing the example of the operation flowchart depicted in the FIG. 18A.

In step S512, the call control server 30 determines whether or not the call connection restriction at the called party side is being invoked, on the basis of the restriction invoking information retained by the group restriction control part 31, and when the call restriction at the called part is being invoked (YES), the flow proceeds to next step S513, and when the call restriction at the called party is not being invoked (NO), the flow proceeds to step 523 in FIG. 18C.

In step S513, the call control server 30 searches the subscriber management DB 400, for an affiliating group ID in a subscriber record associated with a user terminal receiving a call.

In step S514, a value of the affiliating group ID retrieved in the above step S513 is determined. When there exists a corresponding affiliating group (YES), the flow proceeds to next step S515. When there exist no corresponding affiliating groups, the flow proceeds to step S519 in which it is determined whether or not the call connection request is to be accepted by using the normal restriction ratio.

In step S515, the call control server 30 obtains the affiliating group ID, the number of belonging terminals and the number of calling terminals in a group management record corresponding to the relevant affiliating group ID, by searching the group management DB 200 using, as a key, the relevant affiliating group ID.

In step S516, the call control server 30 obtains a group restriction relaxing ratio, the maximum number of calling terminals, and a maximum call duration time, on the basis of group restriction relaxing information 320 included in the station data 300 of the call control server 30 and the number of belonging terminals obtained in the above step S515.

In step S517, it is determined whether or not the number of calling terminals, which was obtained in the above step S515, is less than or equal to the maximum number of calling terminals, which was obtained in the above step S516. That is, it is determined whether or not the following formula is satisfied:

(the number of calling terminals)=<(the maximum number of calling terminals).

When the number of calling terminals is less than or equal to the maximum number of calling terminals (YES), the flow proceeds to next step S518, and otherwise (NO), the flow proceeds to step S521.

In step S518, on the basis of the group restriction relaxing ratio which was obtained in the above step S516, and the normal restriction ratio 310 which is included in the station data 300, the group restriction ratio associated with the relevant group is calculated as follows:

(a group restriction ratio)=(a normal restriction ratio)× [100−(a group restriction relaxing ratio)]/100

In step S519, it is determined whether or not the call connection request from the relevant user terminal is accepted. Here, it is determined whether or not the call connection request from the relevant user terminal is accepted, on the basis of the group restriction ratio obtained in the above step S518 when the flow has proceeded from the above step S518 to this step, or on the basis of the normal restriction ratio when the flow has proceeded from the above step S514 to this step.

In step S520, when the result of the determination made in the above step S519 is that the call connection request is to be accepted (YES), the flow proceeds to step S523 in FIG. 18C, and otherwise (NO), the flow proceeds to step S522.

In step S521, the call control server 30 announces a guidance message notifying, for example, that the call connection request is not accepted because other users within the same group are making phone calls, and then, the process terminates.

In step S522, the call control server 30 announces a guidance message notifying, for example, that a call is to be attempted again after a while, and then, the process terminates.

FIG. 18C is a diagram illustrating an example of an operation flowchart for a call control apparatus, according to an embodiment, which illustrates a flowchart of processes of connecting a call, processes during a call and processes of disconnecting a call, and this operation flowchart is executed subsequent to executing of the operation flowchart of FIG. 18B.

In step S523, the call control server 30 determines whether or not restriction relaxing at the calling party side was performed. When the restriction relaxing was performed (YES), the flow proceeds to next step S524, and otherwise (NO), the flow proceeds to step S525.

In step S524, the call control server 30 request the group management server 20 to search the group management DB 200, and to increment (add by one) the number of calling terminals and the difference number of calling terminals in a group management record corresponding to a group to which a call-originating user belongs.

In step S525, it is determined whether or not restriction relaxing at the called party side was performed. When the restriction relaxing was performed (YES), the flow proceeds to next step S526, and otherwise (NO), the flow proceeds to step S527.

In step S526, the call control server 30 request the group management server 20 to search the group management DB 200, and to increment (add by one) the number of calling terminals and the difference number of calling terminals in a group management record corresponding to a group to which a call-receiving user terminal belongs.

In step S527, processing for connecting a call are performed, and the maximum call duration time is set at a shorter one of the following two times: the maximum call duration time which is set for a group size range matching the calling party, and the maximum call duration time which is set for a group size range matching the called party. Here, the above two group size ranges for the calling party and the called party are set to the group restriction relaxing information 320 included in the station data 300.

In step S528, processing for a call communication is performed. Here, when a call duration time exceeds the maximum call duration time, the call is forcedly disconnected. When both the restriction relaxing at the calling party side and the restriction relaxing at the called party side were executed, a shorter one of the two maximum call duration times for the calling party and the called party is applied.

In step S529, processing for disconnecting a call is performed.

In step S530, it is determined whether or not the restriction relaxing at the calling party side was performed. When the restriction relaxing was performed (YES), the flow proceeds to next step S531, and otherwise (NO), the flow proceeds to step S532.

In step S531, the call control server 30 request the group management server 20 to search the group management DB 200, and to decrement (subtract by one) the number of calling terminals and the difference number of calling terminals in a group management record corresponding to a group to which the call-originating user terminal belongs.

In step S532, it is determined whether or not the restriction relaxing at the called party side was performed. When the restriction relaxing was performed (YES), the flow proceeds to next step S533, and otherwise (NO), the flow proceeds to step S534.

In step S533, the call control server 30 request the group management server 20 to search the group management DB 200, and to decrement (subtract by one) the number of calling terminals and the difference number of calling terminals in a group management record corresponding to a group to which a call-receiving user terminal belongs.

In step S534, it is determined whether or not a forced disconnection due to a time-out was executed. When the forced disconnection was executed (YES), the flow proceeds to next step S535, and otherwise (NO), the process terminates.

In step S535, the call control server 30 announces a guidance message notifying that the call is disconnected because of time-out, to both the calling party terminal and the called party terminal, and then, the process terminates.

On the basis of the restriction control information associated with the group size ranges, which are set in advance in the group restriction relaxing information 320, a terminal owned by a representative of each group can make a call under the condition where restriction is relaxed in accordance with the size of the group, and can make phone calls within the group even under the condition where call congestion arises after occurrence of a disaster.

FIG. 19 is a diagram illustrating an example of an operational flowchart of a group management apparatus, according to an embodiment, in which difference data of group management DB 200 is transmitted between service providers by a provider server connecting part 23 of the group management apparatus. This process flowchart can be invoked at predetermined constant time intervals.

In step S601, the provider server connecting part 23 obtains all of the group management records including a update indicating flag with a value "ON", from the group management DB 200 of the own apparatus.

In step S602, the provider server connecting part 23 transmits the group management records obtained in the above step S601 to all of the cooperated other providers, as difference data.

In step S603, for each group management record in the group management DB 200 of the own apparatus, the provider server connecting part 23 set "OFF" to the update indicating flag; "0" to the difference number of belonging terminals; and "0" to the difference number of calling terminals.

In step S604, the provider server connecting part 23 retrieves group management records including therein the number of belonging terminals whose value is set at "0", and delete the retrieved group management records from the group management DB 200 of the own apparatus, and then, the process terminates.

FIG. 20 is a diagram illustrating an example of an operational flowchart of a group management apparatus, according to an embodiment, in which a provider server connecting part 23 of the group management server 20 receives difference data of a group management DB 200 from a group management server 20 of other service providers. This operational flowchart can be executed every time difference data is received from group management servers of other service providers.

In step S701, the provider server connecting part 23 receives difference data from the group management servers of other service providers.

In step S702, the provider server connecting part 23 searches the group management DB 200 of the own apparatus for group management records having a group ID matching one of group IDs of group management records included in the received difference data.

In step S703, when there exists at least one group management record having the matching group ID is retrieved in the above step S702 (YES), the flow proceeds to next step S704, and otherwise (NO), the flow proceeds to step S708.

In step S704, since it is determined in the step S703 that there exists at least one group in which the number of terminals or the number of calling terminals have increased or decreased by other service providers, the difference number of calling terminals included in the group management record contained in the received difference data, is incorporated into the number of calling terminals included in the corresponding group management record (i.e., a group management record having the same group ID) held in the group management DB 200 of the own apparatus. That is, the number of calling terminals included in the corresponding group management record held in the group management DB 200 of the own apparatus is increased or decreased by a value indicated by the received difference number of calling terminals.

In step S705, the number of belonging terminals included in the group management record contained in the received difference data is incorporated into the number of belonging terminals included in the corresponding group management record (i.e., a group management record having the same group ID) held in the group management DB 200 of the own apparatus. That is, the number of belonging terminals included in the corresponding group management record held in the group management DB 200 of the own apparatus is increased or decreased by a value indicated by the received difference number of belonging terminals.

In step S706, it is determined whether or not the number of belonging terminals included in the corresponding group management record (i.e., a group management record having the same group ID) stored in the group management DB 200, is equal to "0" as a result of the process in the above step S705, and in the case where the number is equal to "0" (YES), the flow proceeds to next step S707, and otherwise (NO), the process terminates.

In step S707, the group management records, each having the number of belonging terminals whose value is equal to "0", are deleted from the group management DB 200, and then, the process terminates.

In step S708, since it is determined that a user terminal belonging to one of other service providers has created a new group, in the above step S707, a group ID, location information, the number of belonging terminals and the number of calling terminals contained in the received difference data are set to a new group management record which is added and registered in the group management DB 200 of the own apparatus, and then the process terminates. At this time, initial values are set to other fields in the relevant group management record.

Figure 22:
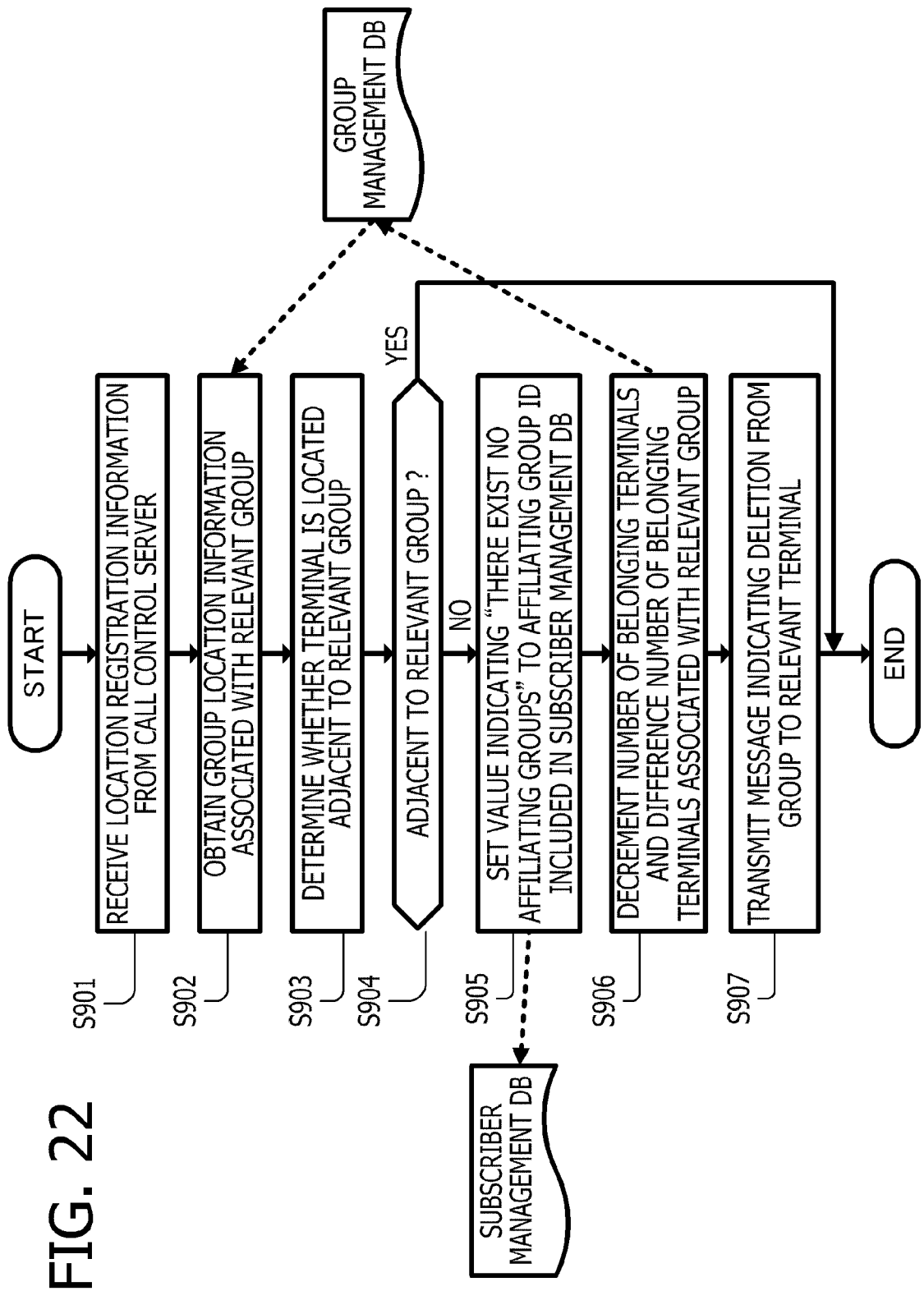
FIG. 22 is a diagram illustrating an example of an operational flowchart of a group management server when performing a location registration in conjunction with a movement of a user terminal, according to an embodiment.

As depicted in FIGS. 21 and 22, by periodically transmitting and receiving difference data in the group management records to/from the group management servers of different service providers, it is possible for the individual service providers to retain common group management DB and perform restriction control across the different service providers. The cooperation of difference data among the different service providers can be periodically performed; however, it is preferable to perform the cooperation at intervals of approximately one minute so that registrations of user terminals across the different service providers can be performed much earlier even at the initial step of creating a group, and further, communication conditions of user terminals each belonging to a different service provider can be grasped as early as possible.

Additionally, in step S604 depicted in the FIG. 19, at approximately the same time when a service provider A deletes a group X having the number of belonging terminals of a value "0" after transmitting difference data, a user terminal belonging to another service provider B may be added to the group X. In this case, by employing the method of cooperation across the different service providers depicted in the FIGS. 19 and 20, the group X can be recovered as a newly added group when the service provider A receives difference data from the service provider B.

FIG. 21 is a diagram illustrating an example of an operational flowchart of a call control server when performing a location registration in conjunction with a movement of a user terminal, according to an embodiment, in which a terminal owned by a user is deleted from the group when the location registration of the terminal is performed in conjunction with a movement of the user.

In step S801, in conjunction with a movement of a terminal, the call control server 30 performs a location registration of the relevant terminal.

In step S802, the call control server 30 searches the subscriber management DB 400 in the HLR 40, for an affiliating group ID in a subscriber record associated with the terminal for which the location registration was performed.

In step S803, a value of the affiliating group ID which was acquired in the above step S802 is determined. When there exists a group to which the relevant terminal belongs (YES), the flow proceeds to next step S804, and otherwise (NO), since the relevant terminal belongs to no group, no process is performed, and the process terminates. This determination can be made by determining whether or not a value of the affiliating group ID acquired in the above step S802 is set at a unused value, for example, "0". For example, it is possible to determine that there exists an affiliating group when the value is not equal to "0", and to determine that there exists no affiliating groups when the value equals to "0".

In step S804, the call control server 30 read out location information from a subscriber record associated with the terminal for which the location registration was made.

In step S805, the call control server 30 transmits, to the group management server 20, the location registration information associated with the terminal for which the location registration was made, which includes a subscriber number, location information, and an affiliating group ID, and then the process terminates. On the basis of the location registration information notified above, the group management server 20 performs a process of deleting the relevant terminal.

FIG. 22 is a diagram illustrating an example of an operational flowchart of a group management server when performing a location registration in conjunction with a movement of a user terminal, according to an embodiment, in which a terminal owned by a user is deleted from the group when the location registration of the terminal is performed in conjunction with a movement of the user. This process flowchart is executed when the registration information was transmitted from the call control server 30 to the group management server 20 as described in step S805 of the above FIG. 21.

In step S901, the group management server 20 receives the location registration information, which was transmitted from a call control server 30 to the group management server 20 in step S805 depicted in the above FIG. 21. The location registration information includes a subscriber number, location information, and an affiliating group ID associated with the moved user terminal.

In step S902, the group management server 20 searches the group management DB 200 by using, as a key, the affiliating group ID included in the received location registration information, to obtain group location information in a group management record associated with the relevant group. This group location information is initial location information at the time when the relevant group was created.

In step S903, the group management server 20 determines whether or not the terminal is located adjacent to the relevant group, by comparing the group location information associated with the relevant group, which was obtained in the above step S902, with terminal location information associated with the terminal for which the location registration was made in conjunction with a movement thereof. For example, when the resultant difference value is less than or equal to a predetermined value, it is determined that the terminal is located adjacent to the relevant group.

In step S904, when the resultant difference value is less than a predetermined value (YES), it is determined that the relevant terminal is located adjacent to the relevant group, and then, the process terminates, and otherwise (NO), it is determined that the terminal is not adjacent to the relevant group, in other words, that the terminal is apart from the relevant group, and then, the flow proceeds to next step S905.

In step S905, the group management server 20 set a value representing that "there exist no affiliating groups", for example, "0", to the affiliating group ID in a subscriber record associated with the relevant terminal, included in the subscriber management DB 400 of the HRL 40.

In step S906, the group management server 20 decrements (subtracts by one) the number of belonging terminals and the difference number of belonging terminals in the group management record associated with the relevant group, respectively.

In step S907, the group management server 20 transmits a message notifying that "your terminal has been deleted because it is located apart from the registered location of your group" to the relevant terminal by e-mail, and then, the process terminates. Here, the message is transmitted by e-mail, differing from the deletion from a group intended by a user as depicted in the above FIG. 16. This is because that the message notifying the deletion of the terminal can not be displayed on a screen of the terminal by using the Web application function since the terminal is not accessing a Web site of the group management server 20.

In the drawings used for detailed explanation of the foregoing embodiment, a mobile telephone network is described as an exemplary example; however, essence of the embodiment is not limited to this, but can be also applied to, for example, a fixed telephone network.

All examples and conditional language recited herein are intended for pedagogical purposes to aid the reader in understanding the embodiment and the concepts contributed by the inventor to furthering the art, and are to be construed as being without limitation to such specifically recited examples and condition, nor does the organization of such examples in the specification relate to a showing of superiority and inferiority of the embodiment. Although the embodiments have been described in detail, it should be understood that the various changes, substitutions, and alternations could be made hereto without departing from the spirit and scope of the invention.

What is claimed is:

1. A method in a system including a plurality of terminals, a call control apparatus for controlling restriction on call connections of the plurality of terminals, and a group management apparatus for grouping the plurality of terminals, the method comprising:
    creating, by the group management apparatus, one or more groups each including one or more terminals included in the plurality of terminals;
    associating, by the call control apparatus, each of the one or more groups with the maximum number of calling terminals and a group restriction relaxing ratio indicating a relaxing degree of restriction with respect to a predetermined normal restriction ratio;
    controlling, by the call control apparatus, restriction on a call connection of a first terminal belonging to none of the one or more groups, on the basis of the predetermined normal restriction ratio; and
    controlling, by the call control apparatus, restriction on a call connection of a grouped terminal belonging to a first group included in the one or more groups, on the basis of a group restriction ratio assigned to the first group when the number of calling terminals within the first group is less than the maximum number of calling terminals that is associated with the first group, wherein
    the group restriction ratio is calculated using the predetermined normal restriction ratio and the group restriction relaxing ratio associated with the first group.

2. The method of claim 1, wherein
    the group restriction ratio is calculated by a calculation formula $$A=B*(100-C)/100,$$

where A is the group restriction ratio in percentage, B is the predetermined normal restriction ratio in percentage, and C is the group restriction relaxing ratio in percentage.

3. The method of claim 1, wherein the group management apparatus creates a second group by performing a procedure comprising:
    generating a group ID for identifying the second group to be generated, in response to a group creation request from the first terminal belonging to none of the one or more groups;
    creating the second group identified by the generated group ID and including the first terminal therein;
    sending the group ID to the first terminal;
    receiving a terminal addition request from a second terminal belonging to none of the one or more groups; and
    adding the second terminal to the second group, wherein
    the group ID is extracted from information displayed on the first terminal, and the terminal addition request including the extracted group ID is transmitted to the group management apparatus.

4. The method of claim 3, wherein
    the terminal addition request includes the group ID that is extracted from a QR code displayed on the first terminal.

5. The method of claim 1, further comprising:
    providing, by the group management apparatus, each of the one or more groups with group location information;
    providing a subscriber management data base for storing terminal location information in association with each of the plurality of terminals; and determining, by the group management apparatus, whether or not the first terminal is located adjacent to the first group by comparing the terminal location information provided for the first terminal with the group location information provided for the first group, wherein
the first terminal is added to the first group when it is determined that the first terminal is located adjacent to the first group.

6. The method of claim 5, wherein
the grouped terminal belonging to the first group is deleted from the first group when it is determined that the grouped terminal is not located adjacent to the first group.

7. The method of claim 1, further comprising:
transmitting, by the group management apparatus, group information including the number of calling terminals within the first group to the grouped terminal, so as to display the group information on the grouped terminal.

8. An apparatus for controlling restriction on call connections of a plurality of terminals wherein one or more groups each including one or more terminals included in the plurality of terminals are provided, the apparatus comprising:
station data for storing a predetermined normal restriction ratio and one or more restriction control records, each including a group restriction relaxing ratio and the maximum number of calling terminals in association with a group size range, the group restriction relaxing ratio indicating a relaxing degree of restriction with respect to the predetermined normal restriction ratio, wherein each of the one or more groups is associated with the group restriction relaxing ratio and the maximum number of calling terminals, via the group size range to which the each of the one or more groups belongs; and
a group restriction control part for controlling restriction on call connections, a call connection of a first terminal belonging to none of the one or more groups being restricted on the basis of the predetermined normal restriction ratio, a call connection of a grouped terminal belonging to a first group included in the one or more groups being restricted on the basis of a group restriction ratio associated with the first group when the number of calling terminals within the first group is less than the maximum number of calling terminals that is associated with the first group, wherein
the group restriction ratio associated with the first group is calculated using the predetermined normal restriction ratio and the group restriction relaxing ratio associated with the first group.

9. The apparatus of claim 8, wherein
the group restriction ratio is calculated by a calculation formula $A=B*(100-C)/100,$ where A is the group restriction ratio in percentage, B is the predetermined normal restriction ratio in percentage, and C is the group restriction relaxing ratio in percentage.

10. A system comprising:
a plurality of terminals;
a group management apparatus for creating one or more groups each including one or more terminals included in the plurality of terminals; and
a call control apparatus for controlling restriction on call connections, the call control apparatus including:
station data for storing a predetermined normal restriction ratio and one or more restriction control records, each including a group restriction relaxing ratio and the maximum number of calling terminals in association with a group size range, the group restriction relaxing ratio indicating a relaxing degree of restriction with respect to the predetermined normal restriction ratio, wherein each of the one or more groups is associated with the group restriction relaxing ratio and the maximum number of calling terminals, via the group size range to which the each of the one or more groups belongs; and
a group restriction control part for controlling restriction on call connections, a call-connection of a first terminal belonging to none of the one or more groups being restricted on the basis of the predetermined normal restriction ratio, a call-connection of a grouped terminal belonging to a first group included in the one or more groups being restricted on the basis of a group restriction ratio associated with the first group when the number of calling terminals within the first group is less than the maximum number of calling terminals that is associated with the first group, wherein the group restriction ratio is calculated using the predetermined normal restriction ratio and a group restriction relaxing ratio associated with the first group.

11. The system of claim 10, wherein
the call control apparatus calculates the group restriction ratio by using a calculation formula $A=B*(100-C)/100,$ where A is the group restriction ratio in percentage, B is the predetermined normal restriction ratio in percentage, and C is the group restriction relaxing ratio in percentage.

12. The system of claim 10, wherein
the group management apparatus creates a second group by performing a procedure comprising:
generating a group ID for identifying the second group to be generated, in response to a group creation request from the first terminal belonging to none of the one or more groups;
creating the second group identified by the generated group ID and including the first terminal therein;
sending the group ID to the first terminal;
receiving a terminal addition request from a second terminal belonging to none of the one or more groups; and
adding the second terminal to the second group, wherein
the group ID is extracted from information displayed on the first terminal, and the terminal addition request including the extracted group ID is transmitted to the group management apparatus.

13. The system of claim 10, further comprising:
a subscriber management data base for storing terminal location information in association with each of the plurality of terminals, wherein
the group management apparatus provides each of the one or more groups with group location information, determines whether or not the first terminal is located adjacent to the first group by comparing the terminal location information provided for the terminal with the group location information provided for the first group, and add the first terminal to the first group when it is determined that the first terminal is located adjacent to the first group.

14. The system of claim 13, wherein
the grouped terminal belonging to the first group is deleted from the first group when it is determined that the grouped terminal is not located adjacent to the first group.

15. The system of claim 10, wherein the group management apparatus comprising:
- a group management data base for storing one or more group management records, each including the number of belonging terminals and the number of calling terminals in association with each of the one or more groups;
- a group management part for registering and updating the one or more group management records in response to a request from the plurality of terminals; and
- a group management DB access part for transmitting information included in the one or more group management records to the call control apparatus, wherein
- the group management DB access part transmits to the call control apparatus the number of belonging terminals and the number of calling terminals.

16. The system of claim 10, wherein a terminal included in the plurality of terminals comprises:
- a Web browser part for transmitting a group creation request to the group management apparatus, receiving a group ID of a group created by the group management apparatus from the group management apparatus, and displaying the received group ID; and
- a code reading part for reading a group ID of a group to which the terminal is to be added, and transmitting a terminal addition request including the read group ID to the group management apparatus.

* * * * *